(12) United States Patent
Matsuzawa et al.

(10) Patent No.: US 7,086,621 B1
(45) Date of Patent: Aug. 8, 2006

(54) FISHING REEL

(75) Inventors: Shuichi Matsuzawa, Saitama (JP); Harumichi Oishi, Tokyo (JP); Takenori Otsu, Tokyo (JP); Naoyuki Ezuka, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/179,465

(22) Filed: Oct. 27, 1998

(30) Foreign Application Priority Data

| Oct. 27, 1997 | (JP) | ................................. P.9-311515 |
| Aug. 3, 1998 | (JP) | ............................... P.10-218936 |
| Sep. 4, 1998 | (JP) | ............................... P.10-251138 |

(51) Int. Cl.
*A01K 89/01* (2006.01)

(52) U.S. Cl. .................................. 242/289; 188/181 A

(58) Field of Classification Search ................ 242/289; 188/181, 185, 181 A
See application file for complete search history.

(56) References Cited

U.S. PATENT DOCUMENTS

| 467,849 | A | * | 1/1892 | Bean ........................... 242/289 |
| 871,167 | A | * | 11/1907 | Gilmore ...................... 242/289 |
| 948,026 | A | * | 2/1910 | Scotochmer ................ 242/289 |
| 1,347,529 | A | | 7/1920 | Wheery |
| 2,967,676 | A | * | 1/1961 | Klingberg ................... 242/289 |
| 3,477,659 | A | * | 11/1969 | Morritt ........................ 242/289 |
| 4,601,438 | A | * | 7/1986 | Young ......................... 242/289 |
| 4,718,617 | A | * | 1/1988 | Vadasz et al. .............. 242/243 |
| 5,356,090 | A | * | 10/1994 | Sato ............................ 242/289 |
| 5,372,324 | A | * | 12/1994 | Sato ............................ 242/312 |
| 5,393,005 | A | * | 2/1995 | Nakajima ................... 242/289 |
| 5,542,619 | A | * | 8/1996 | Karlsson ..................... 242/289 |
| 5,865,387 | A | * | 2/1999 | Hirano ........................ 242/289 |

FOREIGN PATENT DOCUMENTS

| EP | 5531 | 11/1914 |
| JP | 56-100187 | 8/1981 |
| JP | 57-202234 | 12/1982 |
| JP | 2535505 | 2/1997 |
| JP | 9-275860 | 10/1997 |

* cited by examiner

Primary Examiner—Emmanuel M Marcelo
(74) Attorney, Agent, or Firm—Berenato, White & Stavish

(57) ABSTRACT

A fishing reel includes: a spool rotatably supported in a reel main body; a support member integrally rotating with the spool; a plurality of brake members slidably supported to the support member; and a brake surface provided in the reel main body, the brake surface being slidingly contactable with the brake members; wherein according to the rotation of the spool, an urging force is applied to the brake members in a direction where the brake members move away from the brake surface, and the brake members is slidingly contactable with the brake surface against the urging force, when a centrifugal force more than a predetermined value is applied to the spool.

4 Claims, 18 Drawing Sheets

FISHING REEL

BACKGROUND OF THE INVENTION

1. Field of the Invention

The present invention relates to a fishing reel including a brake device capable of applying a brake force to a spool while the spool is rotating.

2. Description of the Related Art

In a casting operation, due to the weight of terminal tackles, reaction of a fishing rod, wind and the like, a spool can be rotated suddenly, so that the rotation speed of the spool can be faster than the play-out speed of a fishing line to thereby cause a backlash. The backlash raises some troubles: for example, the backlash can cause the different portions of the fishing line to be entwined together, or can cause the fishing line to be inserted into between the outer peripheral portion of the flange of the spool and the reel main body. To prevent such troubles, there is conventionally known a fishing reel which includes a centrifugal brake device.

For example, in the registered Japanese Utility Model No. 2535505, Japanese Patent Publication No. 9-275860 of Heisei and the like, there is proposed a centrifugal brake device including a plurality of brake blocks which can be switched over between their respective brake operation positions and brake non-operation positions.

In the conventional centrifugal brake device, the brake blocks can be respectively slided in the spool radial direction due to a centrifugal force generated when the spool is rotated and thus can be frictionally contacted with a brake shoe fixed to the reel main body, thereby being able to apply a brake force, which corresponds to the then frictional contact pressure, to the spool. Also, the brake blocks can be switched by a restrict member provided in the present centrifugal brake device between their respective brake operation positions, where they are frictionally contacted with the brake shoe to thereby be able to apply a given brake force to the spool, and their respective brake non-operation positions where they are distant from the brake shoe to thereby allow the spool to rotate freely.

However, the conventional centrifugal brake device is structured such that it simply can switch the brake blocks over between the brake operation positions, where they are frictionally contacted with the brake shoe, and the brake non-operation positions where they are moved away from the brake shoe; that is, in the brake operation, since the brake blocks are contacted with the brake shoe instantaneously and with the same force, the brake force to be applied to the spool cannot be adjusted finely. As a result of this, it is impossible to carry out such casting operation as to be able to cope sufficiently and positively with the varying conditions (such as, the weight of terminal tackles, a distance up to a fishing point, wind, the skill of an angler, and the like) in an actual fishing spot.

Also, in the above-mentioned conventional centrifugal brake device, even in the spool low speed rotation that does not require a brake force (that is, even when the spool is to be rotated freely), the brake blocks can be frictionally contacted with the brake shoe due to the centrifugal force produced in the spool rotation operation, which makes it impossible to rotate the spool smoothly and lightly (freely). Due to this, the efficiency of the casting operation is degraded.

In addition, as another means, for example, as disclosed in Japanese Utility Model Publication No. 56-100187 of Showa, there is known a method in which a brake member is disposed in a support rod intersecting at right angles to a spool shaft in such a manner that it can be freely moved in the axial direction of the support rod, whereby the spool can be braked using a centrifugal force.

Also, in order to prevent the backlash positively by applying a stronger brake force to the spool in the rotation area thereof ranging from the low- to middle-speed rotation in the early stage of the casting operation as well as in the rotation area thereof ranging from the middle- to high-speed rotation, for example, as disclosed in Japanese Patent Publication No. 57-202234 of Showa, there is known a system in which the structure of the above-mentioned Japanese Utility Model Publication No. 56-100187 of Showa is employed as a primary brake structure, and a secondary brake structure is added to the primary brake structure, whereby the brake force can be applied to the spool sequentially according to the number of rotations.

However, in the structures disclosed in the above-mentioned two publications, since the rotation of the spool is braked from the early stage of the high-speed rotation of the spool, the brake force is applied to the spool before the spool rotation reaches the high-speed rotation in the casting operation early stage (that is, the rising area of the spool rotation) to thereby restrict the rotation of the spool, that is, restrict the initial rotation speed of the spool, with the result that the carrying distance of the terminal tackles cannot be extended. Therefore, there are still left problems to be solved in these structures when they are used as a spool brake device which not only can extend the carrying distance of the terminal tackles but also can prevent the backlash in the spool.

In the above-cited two conventional structures, because the rotation of the spool is braked from the high-speed rotation early stage of the spool, the rotation speed of the spool is not able to reach the high-speed rotation speed in the casting operation early stage, so that the carrying distance of the terminal tackles cannot be extended.

SUMMARY OF THE INVENTION

The present invention aims at eliminating the problems found in the above-mentioned conventional fishing reel. Accordingly, it is an object of the invention to provide a fishing reel which is able to adjust finely a brake force to be applied to a spool during rotation of the spool, thereby being able to provide an excellent efficiency in a casting operation, in particular, does not brake the rotation of the spool in a spool rotation rising area ranging from the early stage of the casting operation to the high-speed rotation of the spool, thereby being able not only to extend the carrying distance of the terminal tackles but also to prevent the occurrence of the backlash in the spool.

To solve the above object, there is provided a fishing reel includes: a spool rotatably supported in a reel main body; a support member integrally rotating with the spool; a plurality of brake members slidably supported to the support member; and a brake surface provided in the reel main body, the brake surface being slidingly contactable with the brake members; wherein according to the rotation of the spool, an urging force is applied to the brake members in a direction where the brake members move away from the brake surface, and the brake members is slidingly contactable with the brake surface against the urging force, when a centrifugal force more than a predetermined value is applied to the spool.

BRIEF DESCRIPTION OF THE DRAWINGS

Similar reference characters denote corresponding features consistently throughout the attached figures. The preferred embodiments of this invention will be described in detail, with reference to the following figures, wherein;

FIG. 9A is a partial section view thereof, showing a state in which a plurality of brake members are supported on the support member in such a manner as to be movable in the radial direction of the support member; and, FIG. 9B is a partial section view thereof, showing the arrangement of a plurality of projecting portions which are provided in the restrict member so as to restrict the movements of the plurality of brake members;

FIG. 11A shows a state in which all of the brake members are switched so as to be respectively uncontactable with respect to the brake surface of an annular brake body; FIG. 11B shows a state in which only one of the brake members is switched so as to be contactable with respect to the brake surface of an annular brake body; FIG. 11C shows a state in which two of the brake members are switched so as to be contactable with respect to the brake surface of an annular brake body; FIG. 11D shows a state in which three of the brake members are switched so as to be contactable with respect to the brake surface of an annular brake body; and, FIG. 11E shows a state in which all of the brake members are switched so as to be contactable with respect to the brake surface of an annular brake body;

FIG. 14A is an enlarged section view of the centrifugal brake device; and, FIG. 14B is a plan view thereof, showing the relationship between the brake members and elastic hold members;

FIG. 15A is an enlarged section view of the centrifugal brake device; and, FIG. 15B is a plan view thereof, showing the relationship between the brake members and elastic hold members;

FIG. 16A is an enlarged section view of the centrifugal brake device; and, FIG. 16B is a plan view thereof, showing the relationship between the brake members and elastic hold members;

DETAILED DESCRIPTION OF THE PREFERRED EMBODIMENT

First Embodiment

Figure 1:
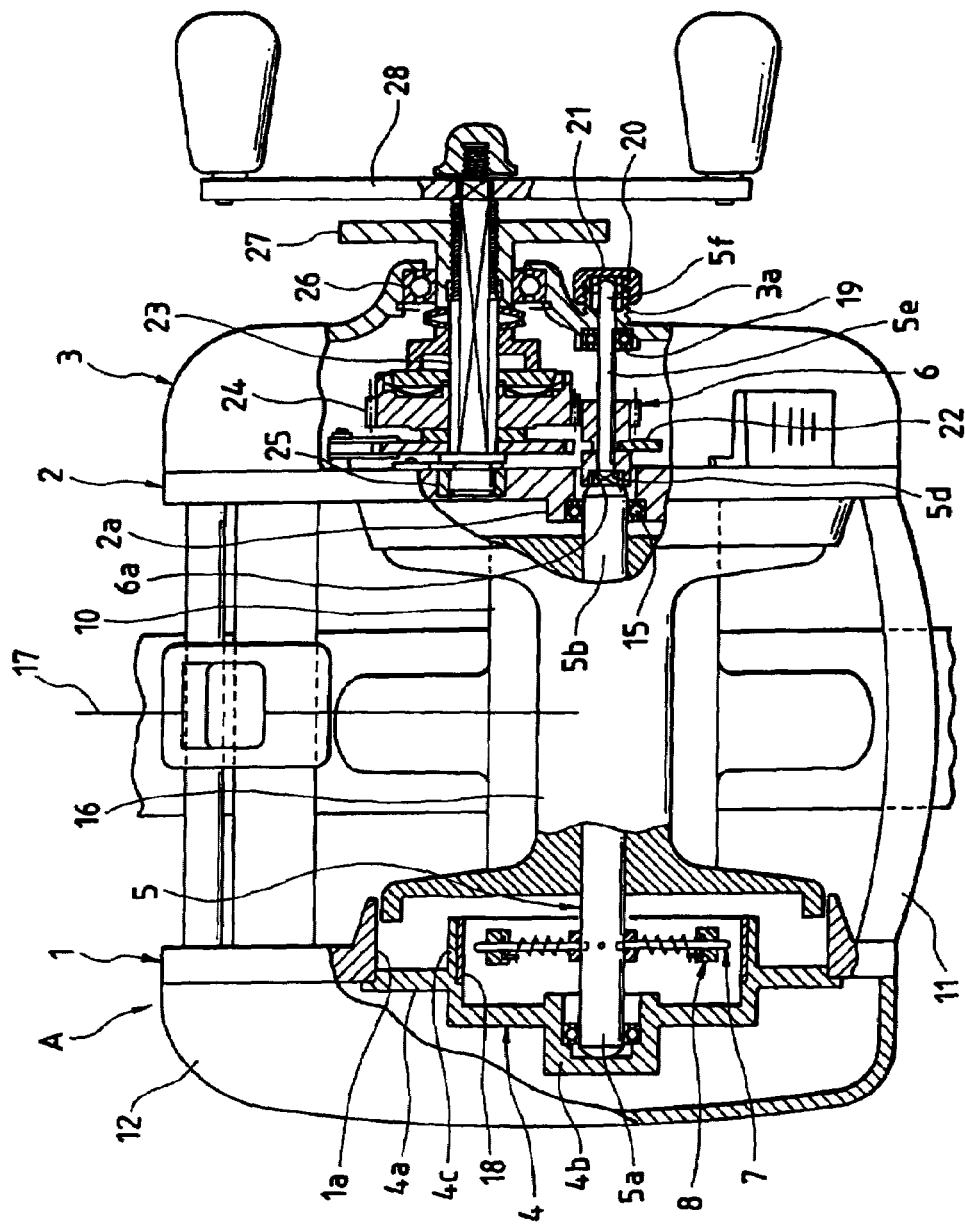
FIG. 1 is a sectional plan view of the main portions of a fishing reel of a double-bearing type according to a first embodiment of the invention.
Figure 2:
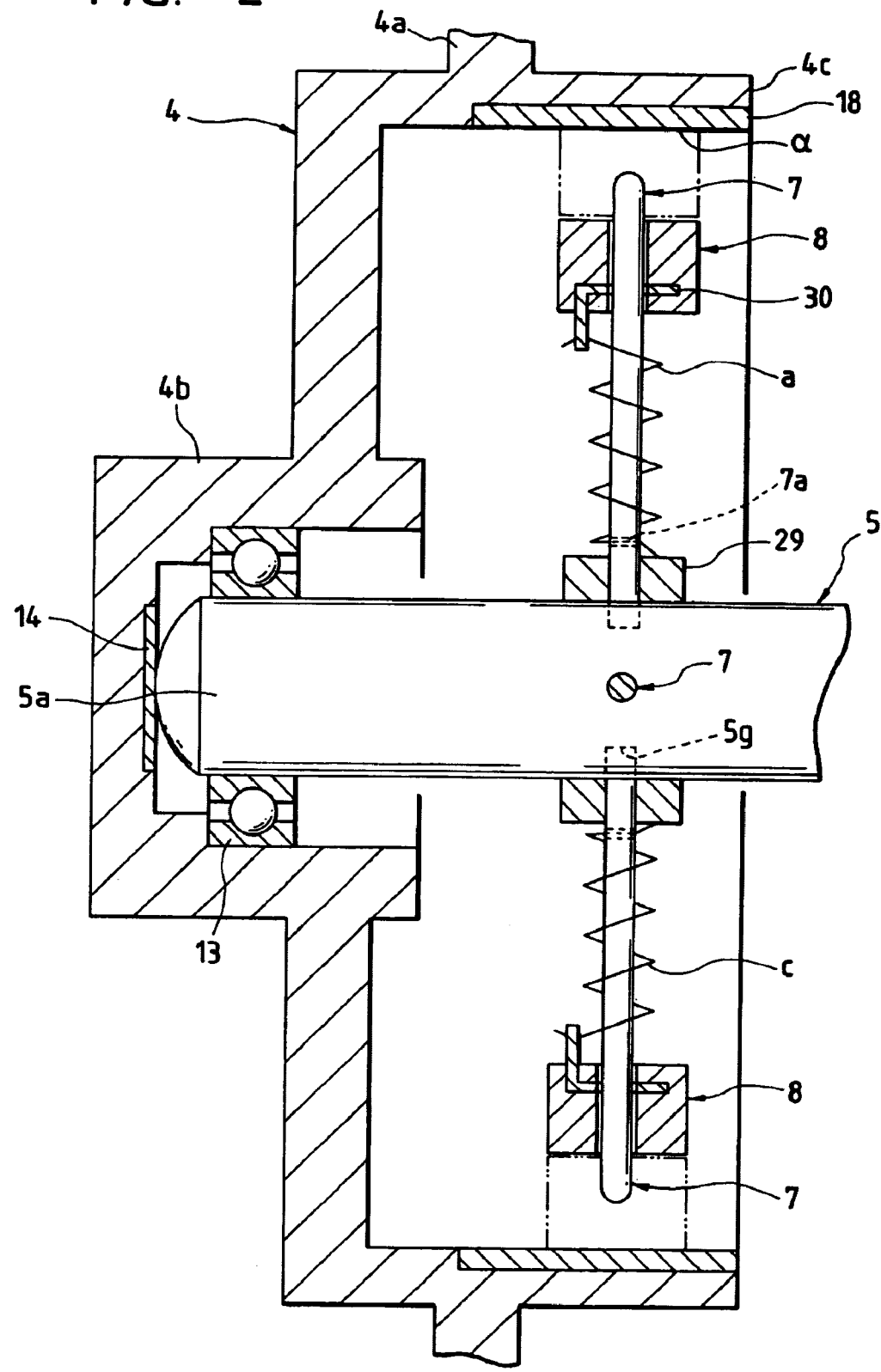
FIG. 2 is an enlarged sectional plan view of the main portions of the left side of a fishing reel of a double-bearing type according to the first embodiment of the invention.
Figure 3:
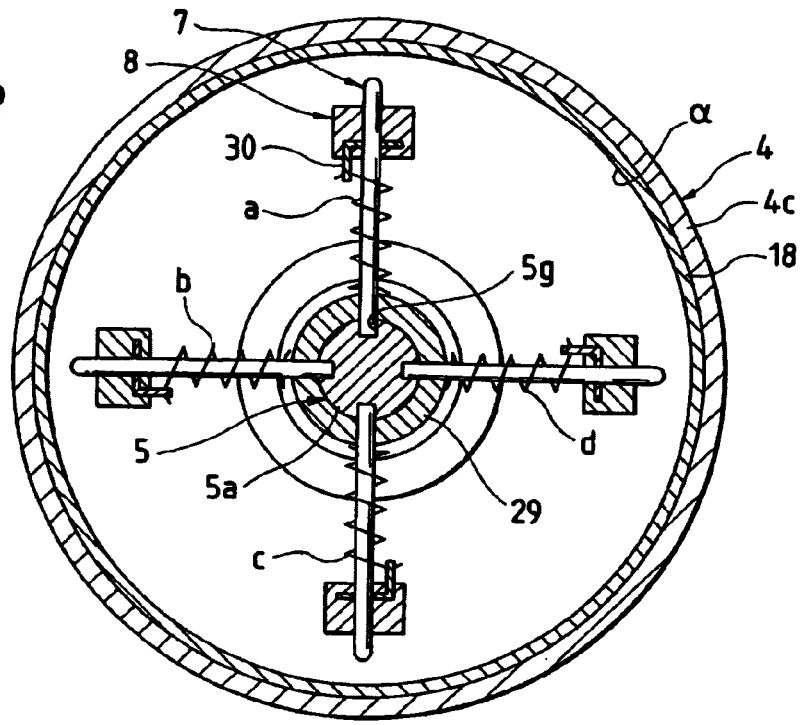
FIG. 3 is an enlarged sectional side view of the main portions of the left side of a fishing reel of a double-bearing type according to the first embodiment of the invention.

Now, description will be given below of a second embodiment of a fishing reel according to the invention with reference to the accompanying drawings. By the way, in the present embodiment, description will be given of a double-bearing type reel as a fishing reel. FIGS. 1 to 3 respectively show a first embodiment of the invention: in particular, FIG. 1 is a sectional plan view of the main portions of a fishing reel of a double-bearing type; FIG. 2 is an enlarged sectional plan view of the main portions of the left side of a fishing reel of a double-bearing type; and, FIG. 3 is an enlarged sectional plan view of the main portions of the left side of a fishing reel of a double-bearing type.

In FIG. 1, in a fishing reel of a double-bearing type, left and right side frames 1 and 2, which cooperate together in forming a reel main body A, are held in parallel to each other by a support column (not shown), a reel leg fixing plate 10 and a finger placement plate 11, while reel side plates 12 and 3 are mounted on the outside portions of the left and right side frames 1 and 2 respectively.

In the left side frame 1, there is formed a through hole 1a; and, the flange portion 4a of a brake disk body 4 including a bearing hold portion 4b and a cylindrical brake portion 4c is removably fitted into the through hole 1a of the left side frame 1 and is secured thereto by a screw (not shown).

A bearing 13 and a thrust plate 14 are respectively mounted on the bearing hold portion 4b and, at the same time, one end 5a of a spool shaft 5 is supported by the bearing hold portion 4b.

The other end 5b of the spool shaft 5 is supported by a bearing 15 on which the bearing hold portion 2a of the right side frame 2 is mounted.

A spool 16, which is fixed to the spool shaft 5, is rotatably interposed between the left and right side frames 1 and 2.

A fishing line 17 is wound around the outer periphery of the winding barrel portion of the spool 16.

A brake ring 18 is fitted with and fixed to the inside portion of the cylindrical brake portion 4c of the brake disk body 4.

The spool shaft 5 includes an engaging portion 5d and a small-diameter portion 5e which are respectively located on the right side portion of the spool shaft 5. And, the spool shaft further includes a spool shaft end portion 5f located on the right of the small-diameter portion 5e; and, the spool shaft end portion 5f is not only carried on a bearing 19 provided in the reel side plate 3 but also is contacted with a thrust receive member 21 disposed within a brake knob 20 which is threadedly engaged with the outer periphery of the cylindrical portion 3a of the reel side plate 3.

A pinion 6 is slidably fitted with the small-diameter portion 5e of the spool shaft 5 within the reel side plate 3, while the engaging portion 5d of the spool shaft 5 and the engaging portion 6a of the pinion 6 can be engaged with or removed from each other by means of the operation of a clutch lever 22.

The pinion 6 is in meshing engagement with a drive gear 24 which is frictionally coupled to a handle drive shaft 23.

The handle drive shaft 23 is supported by a bearing 25 mounted on the right side frame 2 and a bearing 26 mounted on the reel side plate 3, and a brake adjust handle 27 is threadedly engaged with the handle drive shaft 23, whereby the brake force of the handle drive shaft 23 and drive gear 24 can be adjusted.

A handle 28 is mounted on the end portion of the handle drive shaft 23.

On the one-end 5a side outer periphery of the spool shaft 5, there are disposed a plurality of rod-shaped support members 7 in such a manner that they intersect at right angles to the spool shaft.

Referring to the operational structure of the plurality of rod-shaped support members 7, after a collar 29 is fitted with the one-end 5a side outer periphery of the spool shaft 5, if the support members 7 are respectively pressure inserted not only through their corresponding through holes formed in the collar 29 but also into their corresponding holes 5g formed in the spool shaft 5, then the collar 29 can be fixed to the spool shaft 5 by the support members 7.

A plurality of cubic-shaped brake members 8 are loosely fitted with their corresponding support members 7 in such a manner that they are respectively free to move in the radial direction of the spool shaft 5 of spool 16.

Each of the brake members 8 is formed of hard rubber or the like and a spring hitch plate 30 is embedded in the brake member 8.

As the need arises, lead or the like may be contained in the brake member 8 to thereby adjust the weight thereof.

In each of the support members 7, there is opened up a spring hitch transverse hole 7a.

On the respective portions of the support members 7 that are nearer to the spool shaft 5 than the brake members 8, there are loosely fitted springs a, b, c, d, while the two ends of the respective springs a, b, c, d are hitched around the spring hitch plates 30 and spring hitch transverse holes 7a.

The brake members 8 are respectively urged toward the spool shaft 5 by their corresponding springs a, b, c, d.

The weights of the brake members 8 and the urging forces of the springs a, b, c, d are respectively set in such a manner that, before the rotation of the spool 16 becomes faster than the play-out speed of the fishing line 17, the brake members 8 can be slidingly contacted with the annular brake surface $\alpha$ of the brake ring 18 of the brake disk body 4 due to a centrifugal force; whereas, in the rotation areas of the spool 16 which are lower in the rotation speed than the area thereof just before the rotation of the spool 16 becomes faster than the play-out speed of the fishing line 17, the brake members 8 can be spaced apart from the annular brake surface $\alpha$ of the brake ring 18.

The urging forces of the springs a, b, c, d may be changed respectively into $a<b<c<d$; in this case, it is possible to set such brake characteristic that can cope with different degrees of the skill of various anglers or varying conditions in an actual fishing spot.

With the fishing reel structured in the above-mentioned manner, if the handle 28 is rotated, then the drive gear 24 is rotated with a brake force set by the brake adjust handle 27 to thereby rotate the pinion 6 and, at the same time, the spool shaft is rotated with a brake force set by the brake knob 20 to thereby rotate the spool 16.

When trying to throw the terminal tackles into a given point in the water by a casting operation, the engaging portion 6a of the pinion 6 is separated from the engaging portion 5b of the spool shaft 5 by operating the clutch lever 22 to thereby set the spool 16 free and, after then, the fishing rod is thrown or swung down to thereby cast the terminal tackles (not shown).

When the terminal tackles are cast, then the spool 16 is suddenly rotated due to the weight of the terminal tackles, the reaction of the fishing rod or the like to thereby cause the rotation of the spool 16 to be faster than the play-out speed of the fishing line 17, with the result that the backlash is produced in the spool 16; however, actually, before the rotation of a spool 16 becomes faster than the play-out speed of a fishing line 17, the brake members 8 are slidingly contacted with the annular brake surface $\alpha$ of the brake ring 18 of the brake disk body 4 against the elastic forces of the springs a, b, c, d due to a centrifugal force to thereby brake the rotation of the spool 16 so as to be able to prevent the occurrence of the backlash in the spool 16.

When the fishing line 17 is played out with the engaging portion 6a of the pinion 6 and the engaging portion 5b of the spool shaft 5 engaged with each other, the brake knob 20 is rotated to thereby brake the rotation of the spool shaft 5 and, at the same time, the drive gear 24, pinion 6 and spool 16 are respectively rotated with a brake force set by the brake adjust handle 27.

When the fishing reel is structured in the above-mentioned manner, before the rotation of the spool 16 becomes faster than the play-out speed of a fishing line 17, the brake members 8 are slidingly contacted with the annular brake surface $\alpha$ of the brake ring 18 provided in the brake disk body 4 against the elastic forces of springs a, b, c, d due to a centrifugal force to thereby brake the rotation of the spool 16 so as to be able to prevent the backlash of the spool 16; and, the brake members 8 are set in such a manner as to be spaced apart from the annular brake surface α in the rotation areas of the spool 16 which are lower in the rotation speed than the area thereof before the rotation of the spool 16 becomes faster than the play-out speed of the fishing line 17, the rotation of the spool 16 is not restricted in the rotation areas of the spool 16 ranging from the early stage of the casting operation to the high-speed rotation of the spool 16. In particular, as no brake force is applied to the rotation of the spool 16 in the rising stage of the rotation of the spool 16, the spool rotation speed is allowed to become faster and thus the carrying distance of terminal tackles can be extended, so that not only the carrying distance of the terminal tackles can be extended but also the backlash of the spool can be prevented.

Figure 4:
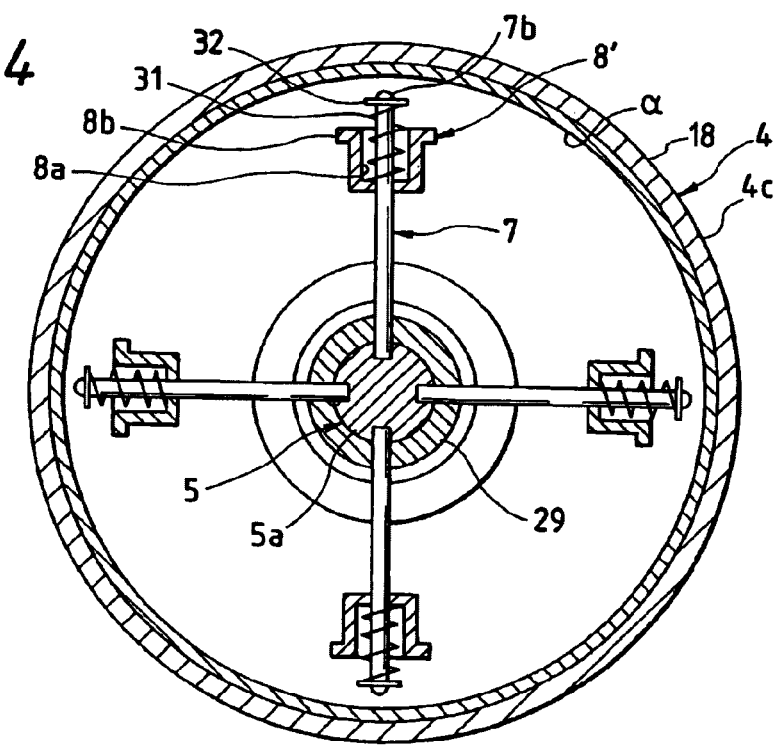
FIG. 4 is an enlarged sectional side view of the main portions of the left side of a fishing reel of a double-bearing type according to a first modification of the first embodiment of the invention.

Now, FIG. 4 shows a first modification of the first embodiment according to the invention and, in particular, FIG. 4 is an enlarged sectional side view of the main portions of the left side of a fishing reel of a double-bearing type.

In the first modification, in the respective leading ends of the plurality of rod-shaped support members 7, there are formed peripheral grooves 7b.

On the respective support members 7, there are loosely fitted recess-shaped brake members 8' each having a flange portion on the upper surface thereof in such a manner that they are free to move in the radial direction of the spool shaft or spool. Also, a spring 31 is fitted with the support member 7 and an E ring 32 is engaged with the peripheral groove 7b, thereby preventing the brake member 8' from being removed from the support member 7.

Referring here to the structure of the brake member 8T, its recessed portion 8a and its flange portion 8b formed on the upper surface thereof are formed integrally with each other, the spring 31 is disposed within the recessed portion 8a, and the brake member 8' is urged in the direction of the spool shaft 5.

The remaining portions of the first modification are substantially identical in structure with those of the previously described first embodiment.

Figure 5:
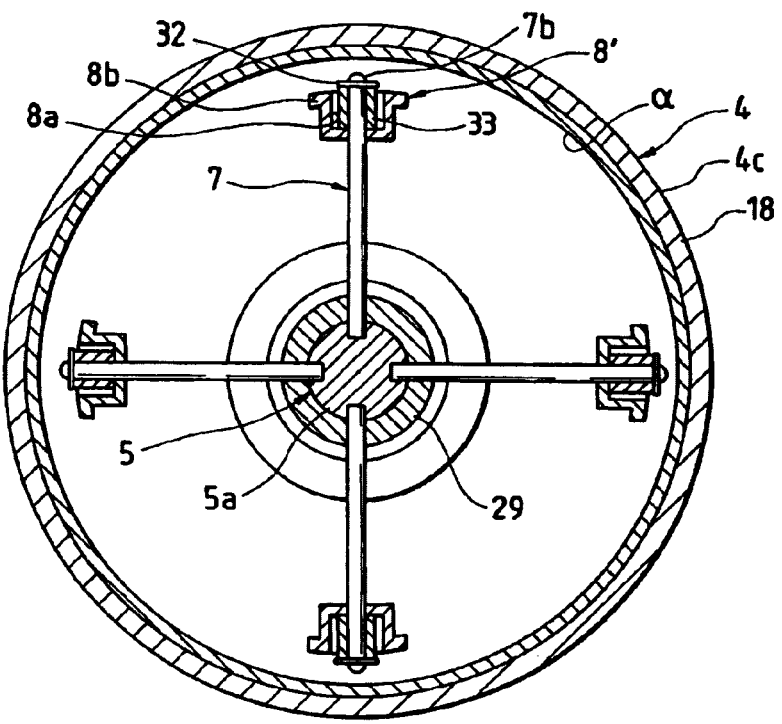
FIG. 5 is an enlarged sectional side view of the main portions of the left side of a fishing reel of a double-bearing type according to a second modification of the first embodiment of the invention.

Now, FIG. 5 shows a second modification of the first embodiment according to the invention and, in particular, FIG. 5 is an enlarged sectional side view of the main portions of the left side of a fishing reel of a double-bearing type.

In the second modification, in the respective leading ends of the plurality of rod-shaped support members 7, there are formed peripheral grooves 7b.

On the respective support members 7, there are loosely fitted recess-shaped brake members 8' each having a flange portion on the upper surface thereof in such a manner that they are free to move in the radial direction thereof. Also, an elastic soft member 33 is fitted with the support member 7 and the E ring 32 is engaged with the peripheral groove 7b, thereby preventing the brake member 8' from being removed from the support member 7.

Referring here to the structure of the brake member 8', its recessed portion 8a and its flange portion 8b formed on the upper surface thereof are formed integrally with each other, the soft member 33 is disposed within the recessed portion 8a, and the brake member 8' is urged in the direction of the spool shaft 5.

The remaining portions of the second modification are substantially identical in structure with those of the previously described first embodiment.

Figure 6:
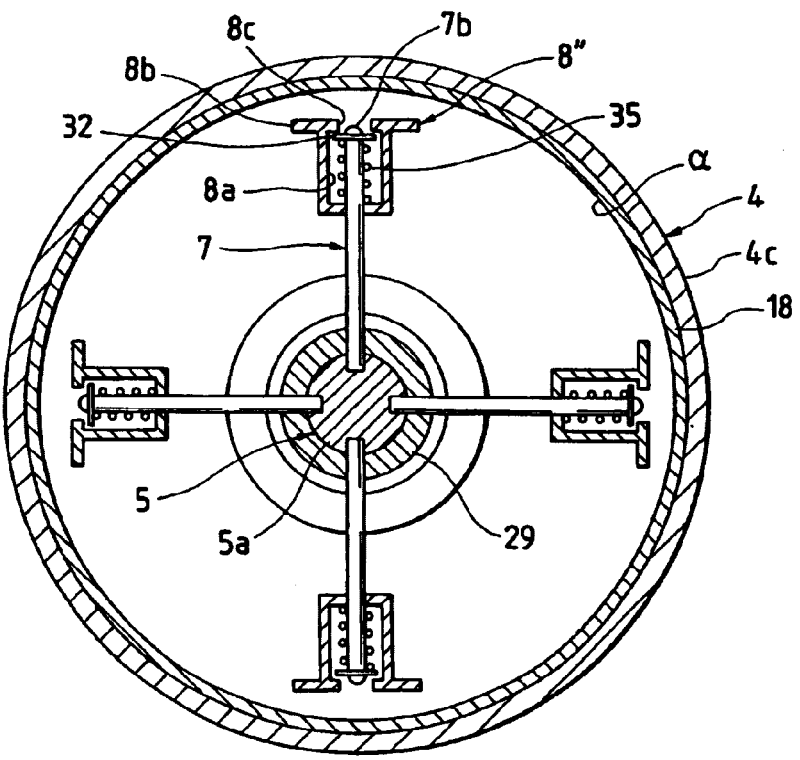
FIG. 6 is an enlarged sectional side view of the main portions of the left side of a fishing reel of a double-bearing type according to a third modification of the first embodiment of the invention.

Now, FIG. 6 shows a third modification of the first embodiment according to the invention and, in particular, FIG. 6 is an enlarged sectional side view of the main portions of the left side of a fishing reel of a double-bearing type.

In the fifth embodiment, in the respective leading ends of the plurality of rod-shaped support members 7, there are formed peripheral grooves 7b.

On the respective support members 7, there are loosely fitted recess-shaped brake members 8'' each having a flange portion on the upper surface thereof in such a manner that they are free to move in the radial direction of the spool shaft or spool. Also, a spring 35 is fitted with the support member 7 and the E ring 32 is engaged with the peripheral groove 7b, thereby preventing the brake member 8'' from being removed from the support member 7.

Referring here to the structure of the brake member 8'', its recessed portion 8a, its flange portion 8b formed on the upper surface thereof, and a flange portion 8c formed in the upper portion of the recessed portion 8a are formed integrally with one another, the spring 35 is disposed within the recessed portion 8a, and the brake member 8'' is urged in the direction of the spool shaft 5 and is held in a state where it is spaced apart from the brake surface of the annular brake body by a given distance due to the engagement with the E ring 32.

The remaining portions of the third modification are substantially identical in structure with those of the previously described first embodiment.

In the foregoing description, as the support members 7, there are shown four support members 7. However, the number of the support members 7 may be two, three, five or more.

Also, in the foregoing description, as the fishing reel, there is shown a fishing reel of a double-bearing type. However, the invention can also apply to other types of fishing reels.

Second Embodiment

Now, description will be given below of a second embodiment of a fishing reel according to the invention with reference to the accompanying drawings. By the way, in the present embodiment, description will be given of a double-bearing type reel as a fishing reel.

Figure 7:
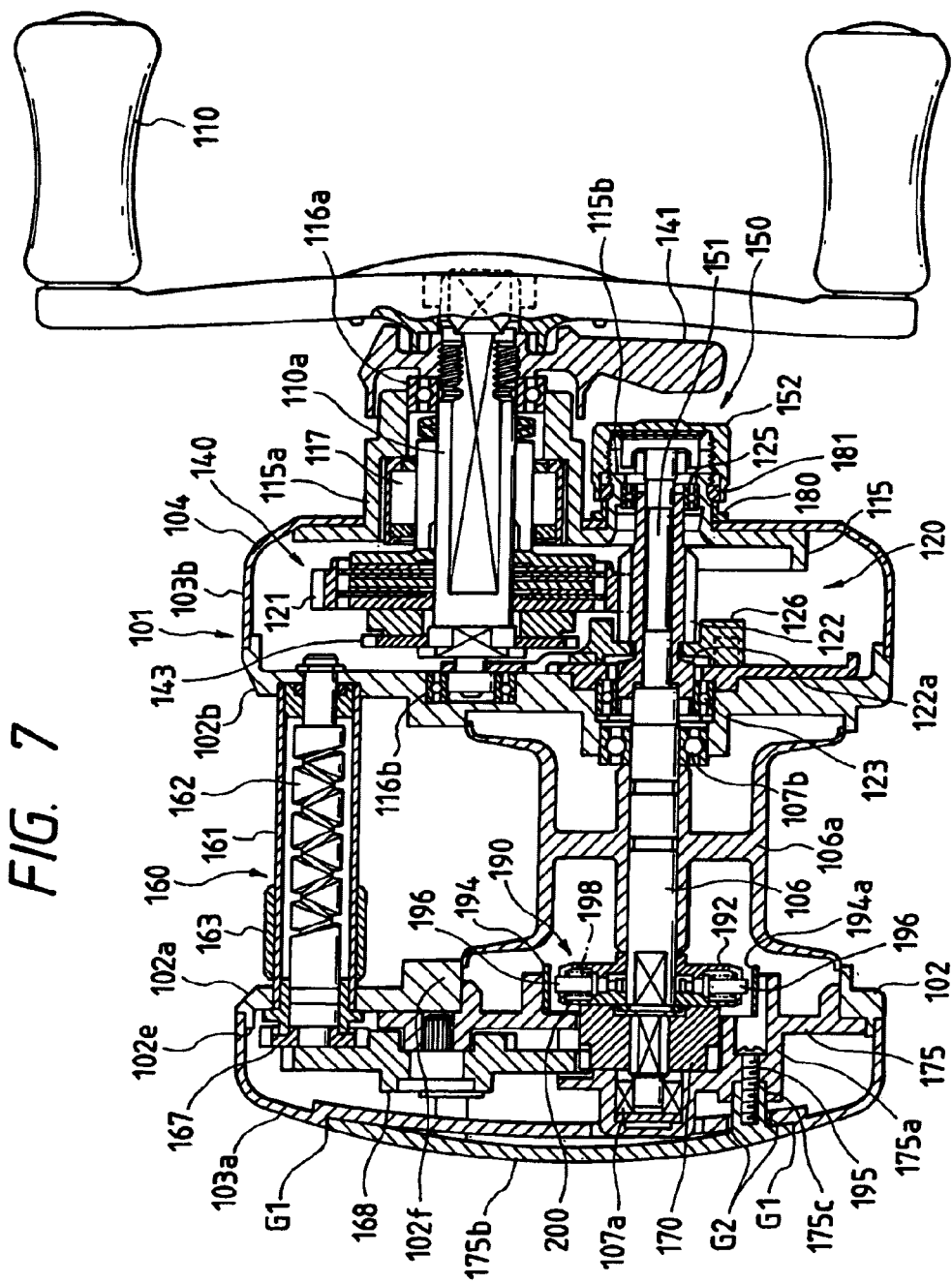
FIG. 7 is a partially sectional side view of the whole structure of a fishing reel according to a second embodiment of the invention.

As shown in FIG. 7, a double-bearing type reel 101 comprises a frame 102 including left and right frames 102a and 102b and a rod mounting portion (not shown) formed integrally with the central portions of the left and right frames 102a and 102b, and a reel main body 104 including left and right side plates 103a and 103b which are respectively mounted on the left and right frames 102a and 102b.

Between the left and right frames 102a and 102b (left and right side plates 103a and 103b), there is rotatably supported a spool shaft 106 through bearings 107a and 107b; and, on the spool shaft 106, there is mounted a spool 106a around which a fishing line can be wound.

The spool 106a is structured such that it can be rotated by operating or rotating a handle 110 which is mounted on the end portion of a handle shaft 110a projecting from the right side plate 103b.

The handle shaft 110a is disposed within a cylindrical portion 115a provided on and projected from a set plate 115 which can be screwed to the right frame 102b; and, the handle shaft 110a is structured such that not only it is supported through bearings 116a and 116b in such a manner as to be rotatable with respect to the cylindrical portion 115a of the set plate 115 as well as with respect to the right frame 102b, but also it can be rotated only in a fishing line take-up direction by a one-way clutch 117.

Between the right frame 102b and right side plate 103b, there are stored a drive mechanism 120, which is used to transmit the rotational movement of the handle 110 to the spool shaft 106, and a drag mechanism 140 which, when the fishing line is played out from the spool 106a in an fishing operation, applies a drag force to the spool 106a.

The drive mechanism 120 includes a drive gear 21 rotatably supported on the handle shaft 110a and a pinion 122 which can be meshingly engaged with the drive gear 121.

The pinion 122 is supported by bearings 123 and 125 in such a manner that it can be freely rotated with respect to the right frame 102b and set plate 115. By the way, the bearing 125 is disposed within a cylindrical portion 115b which is provided on and projected from the set plate 115.

Also, on the outer periphery of the pinion 122, there is formed a circumferential groove 122a; and, with the circumferential groove 122a, there is engaged a clutch plate 126 which can be moved in the axial direction by a clutch operation member (not shown). In this structure, if the clutch operation member is operated to thereby move the pinion 122 in the axial direction, then the drive mechanism 120 can switch the fishing reel over to a drive force transmitting state as shown in FIG. 7 (that is, a clutch-on state) or to a spool free rotation state (that is, a clutch-off state) in which the pinion 122 is disengaged from the spool shaft 106.

By the way, to return the fishing reel from the clutch-off state to the clutch-on state, there can be used not only a method in which the clutch operation member is operated to thereby return the fishing reel from the clutch-off state to the clutch-on state, but also a method in which the handle 110 is operated in the fishing line take-up direction to thereby allow the fishing reel to automatically return from the clutch-off state to the clutch-on state.

Now, the drag mechanism 140 is composed of a friction plate, a lining member and the like. And, the drag mechanism 140 is structured such that, by operating or rotating a drag operation member 141 mounted on the handle shaft 110a, it can be pressed against the drive gear 121 with a given pressure. This pressure is applied onto a ratchet 143 which can be rotated integrally with the handle shaft 110a, thereby generating a drag force between the handle shaft 110a and drive gear 121.

Also, with the spool shaft 106, there is engaged a pressure mechanism 150 which is used not only to absorb the play of the spool shaft 106 in the thrust direction but also to apply a brake force to the rotation of the spool shaft 106. The pressure mechanism 150 includes a thrust shaft 151, which is inserted into the pinion 122 and is contacted with the end face of the spool shaft 106, and a cap 152 which is threadedly engaged with the cylindrical portion 115b of the set plate 115 and is pressed against the thrust shaft 151 in the thrust direction. In this structure, if the cap 152 is tightened, then the thrust shaft 151 is pressed against the end face of the spool shaft 106 by an amount corresponding to the tightened amount of the cap 152, with the result that not only the play of the spool shaft 106 in the thrust direction can be eliminated but also a desired frictional force can be applied to the spool shaft 106.

Also, between the left and right frames 102a and 102b, there is interposed a level wind device 160. And, the level wind device 160 includes a guide cylinder 161 in which an elongated hole (not shown) is formed in such a manner as to extend in the right and left direction thereof, a worm shaft 162 rotatably supported within the guide cylinder 161, an engaging member 163 which is mounted on the guide cylinder 161 in such a manner as to enclose the guide cylinder 161 and is engaged with the worm shaft 162 through the above-mentioned elongated hole, and a fishing line guide part (not shown) mounted on the engaging member 163.

And, a gear 167 is mounted on the worm shaft 162; and, the gear 167 is connected through an intermediate gear 168 with a gear 170 mounted on the spool shaft 106. In this structure, if the handle 110 is operated or rotated to thereby rotate the spool 106a together with the spool shaft 106, then the rotational movement of the spool shaft 106 is transmitted through the gears 170, 168 and 167 to the worm shaft 162, thereby rotating the worm shaft 162. In this rotation transmission, the engaging member 163 of the level wind device 160 is slided right and left in accordance with the rotational movement of the worm shaft 162, so that the fishing line can be wound uniformly around the spool 106a through the fishing line guide part of the engaging member 163.

Here, description will be given below of a mounting structure for mounting the set plates 115 and 175 as well as the left and right side plates 103a and 103b onto the frame 102.

The right side plate 103b is mounted on the right frame 102b in such a manner as to cover the set plate 115 screwed to the right frame 102b. In the right side plate 103b, there are formed holes (not shown) respectively at the positions thereof that correspond to the cylindrical portions 115a and 115b of the set plate 115, whereby the cylindrical portions 115a and 115b are allowed to project from the surface of the right side plate 103b respectively through these holes. In this state, if a collar 180 and an O ring 181 are respectively engaged with the outer periphery of the cylindrical portion 115b, then the right side plate 103b can be prevented against removal.

On the other hand, the left side plate 103a is structured such that it can be mounted on the left frame 102a while it is connected integrally with the set plate 175. In this case, since the left side plate 103a and set plate 175 are mounted respectively on the outer edge portion 102e of the left frame 102a and in a fit hole 102f formed in the left frame 102a, they must be positioned accurately with respect to each other when they are mounted. In view of this, according to the present embodiment, by structuring them in the following manner, the mounting error thereof can be absorbed.

That is, not only the set plate 175 is composed of a main body 175a to be fitted into the fit hole 102f of the left frame 102a and a cover body 175b to be engaged with the left side plate 103a, but also there is formed a hole in the left side plate 103a. And, while a projecting portion 175c provided on the back surface of the cover body 175b is inserted into the hole of the left side plate 103a, the main body 175a and projecting portion 175c are connected together by a screw 195. In this case, the left side plate 103a and cover body 175b are structured such that not only slight gaps G1 can exist between the outer peripheral portion of the cover body 175b and the engaging portion of the left side plate 103a but also slight gaps G2 can exist between the left side plate 103a and projecting portion 175c. According to the present structure, the above-mentioned mounting error can be absorbed by the slight gaps G1 and G2, which makes it possible to mount the left side plate 103a and set plate 175 on the left frame 102a easily and accurately.

Also, according to the fishing reel of the invention, on the left side plate 103a side of the spool shaft 106, there is provided a backlash preventive mechanism which, in the fishing line play-out operation, can prevent the over-rotation of the spool 106a. According to the present embodiment, as the backlash preventive mechanism, there is employed a brake device, that is, a centrifugal brake device 190 which uses a centrifugal force generated due to the rotational movement of the spool 106a (spool shaft 106).

Figure 8A:
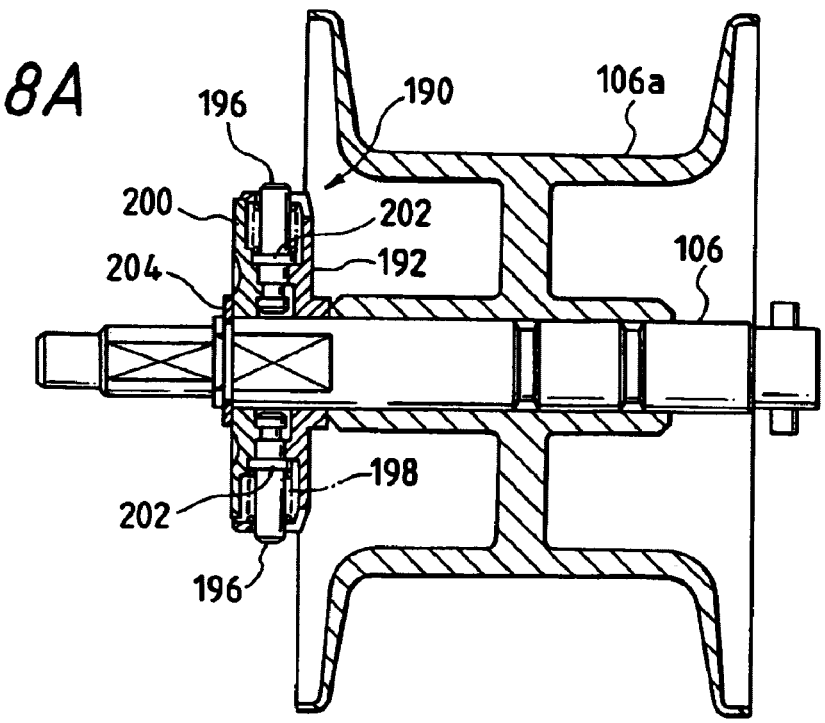
FIG. 8A is an enlarged section view of a state in which a centrifugal brake device is disposed on a spool shaft.
Figure 8B:
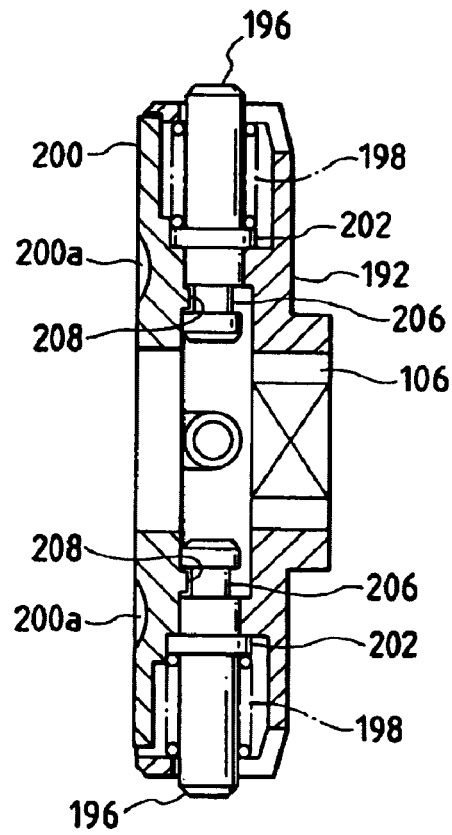
FIG. 8B is an enlarged section view of the structure of the centrifugal brake device.
Figure 9A:
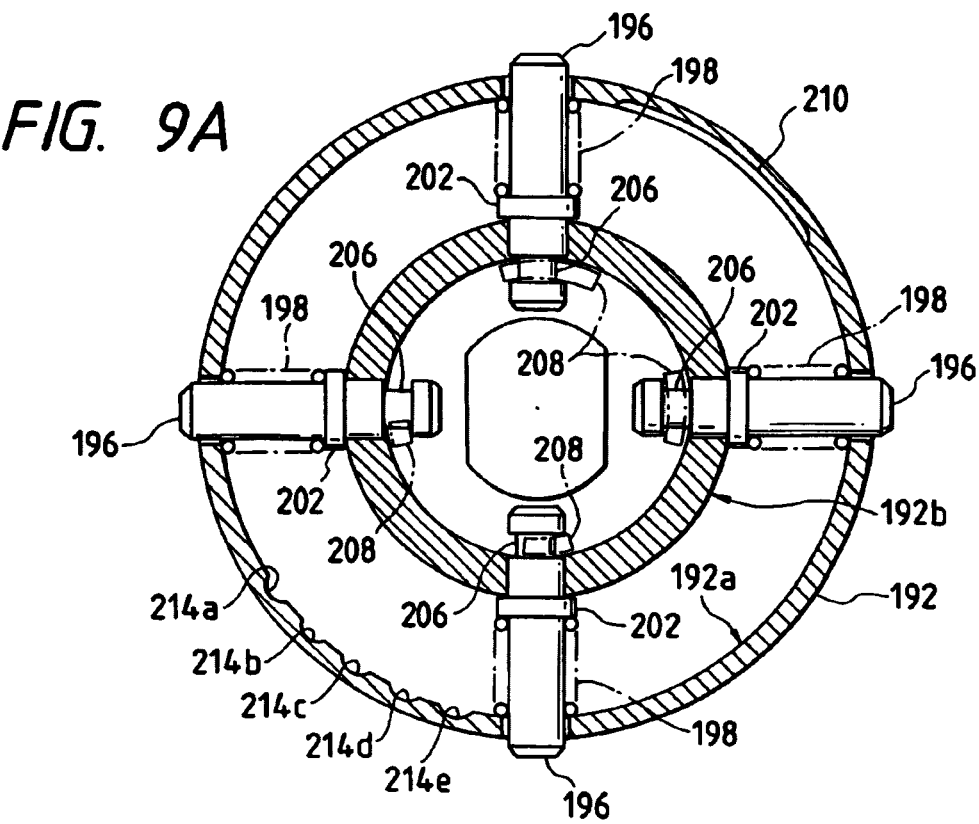
FIGS. 9A and 9B are exploded view of the centrifugal brake device taken apart into a support member and a restrict member; in particular.
Figure 9B:
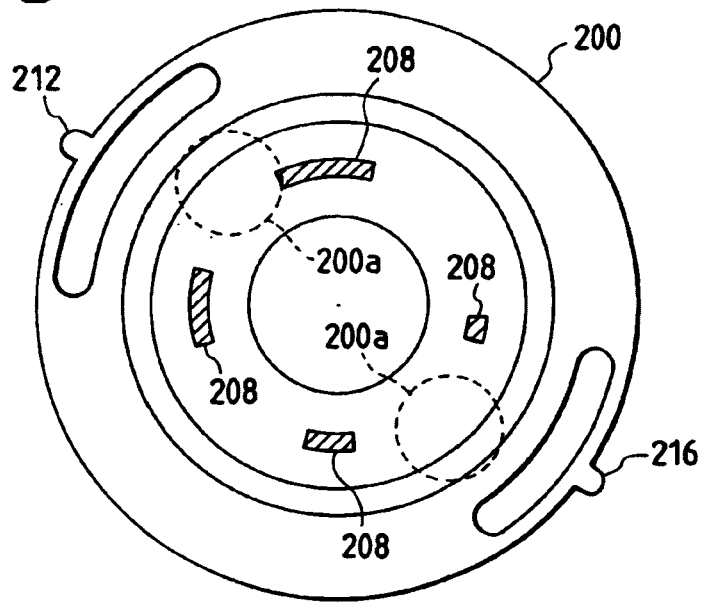
Figure 10A:
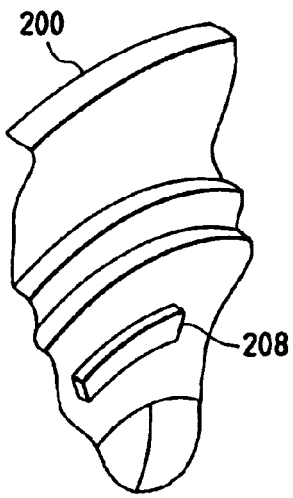
FIG. 10A is a partially enlarged perspective view of the restrict member shown in FIG. 9B.
Figure 10B:
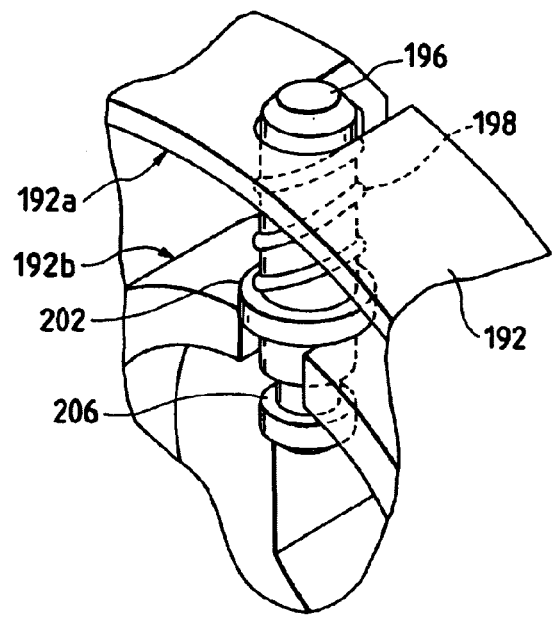
FIG. 10B is a partially enlarged perspective view of the support member shown in FIG. 9A.

As shown in FIGS. 7 to 8B, the centrifugal brake device 190 includes a support member 192 fixed to the spool shaft 106 in a rotation preventive manner, an annular brake body 194 which is fixed to the reel main body 104 and also in the inner periphery of which there is formed a brake surface 194a, a plurality of brake members 196 which are respectively supported on the support member 192 in a removal preventive manner and can be moved not only in a direction where they approach the brake surface 194a of the annular brake body 194 but also in a direction where they are moved away from the brake surface 194a, and a plurality of urging springs 198 which are used to urge their respective brake members 196 in the direction to move away from the brake surface 194a of the annular brake body 194 so as to be able to hold the brake members 196 in such a manner that they are respectively spaced apart from the brake surface 194a of the annular brake body 194 by a given distance. Also, the centrifugal brake device 190 is structured such that, in the rotational operation of the spool 106a, when a centrifugal force is applied to the brake members 196, it can move the brake members 196 against the urging forces of the urging springs 198 into sliding contact with the brake surface 194a, thereby being able to adjust a brake force to be applied to the spool 106a.

Further, in the centrifugal brake device 190, in order to be able to selectively switch the respective brake members 196 to their respective contactable states or to their respective uncontactable states with respect to the brake surface 194a of the annular brake body 194, there is provided a restrict member 200 which can restrict the brake members 196 individually.

By the way, the number of the brake members 196 can be increased or decreased according to their using objects or the like and, in the present embodiment, there are provided four brake members 196 which are supported on the support member 192 in such a manner as to extend along the peripheral direction of the support member 192 at regular intervals.

As shown in FIGS. 8B to 10B, the support member 192 is formed in a substantially disk-like shape, while the four brake members 196 are supported on the substantially disk-shaped support member 192 in such a manner that they extend along the peripheral direction of the support member 192 at regular intervals and can be moved in the radial direction of the support member 192. Also, the urging springs 198 are respectively arranged in a spiral manner between the flange portions 202 of their corresponding brake members 196 and the outer side wall 192a of the support member 192; and, the urging springs 198 apply their respective urging forces in a direction where the flanges 202 are moved away from the outer side wall 192a. Therefore, the respective brake members 196 can be held in such a manner that the flanges 202 are pressed against the contact surface 192b of the support member 192 due to the urging forces of their respective urging springs 198. In this state, the respective brake members 196 can be held in such a manner that they are spaced apart from the brake surface 194a of the annular brake body 194 by a given distance (see FIG. 7).

Also, the restrict member 200 is formed in such a manner as to have a substantially disk-like shape and is also structured such that it can be rotatably fitted into the support member 192. In this case, after the restrict member 200 is fitted into the support member 192, if a removal preventive ring 204 is mounted on the spool shaft 106, then the restrict member 200, while maintaining its rotatable state, can be fitted into the support member 192 in a removal preventive manner. By the way, to rotate the restrict member 200, an operator may put his or her finger onto a finger contact portion 200a formed on the outer surface of the restrict member 200 and then may operate or rotate the restrict member 200.

In the respective brake members 196, in more particular, in the lower end portions thereof, there are formed recessed portions 206, one recessed portion 206; and, on the other hand, in the restrict member 200, there are provided four projecting portions 208 at the positions thereof where the projecting portions 208 can be engaged with the respective recessed portions 206 of the four brake members 196. The four projecting portions 208 respectively have different lengths along the peripheral direction of the restrict member 200 and, by operating or rotating the restrict member 200, the projecting portions 208 can be selectively engaged with or disengaged from the recessed portions 206 of their corresponding brake members 196.

Also, in the outer side wall 192a of the support member 192, there is formed a guide groove 210 in such a manner as to extend along the peripheral direction thereof, whereas, on the outer periphery of the restrict member 200, there is provided a guide piece 212 which can be engaged with the guide groove 210. According to this structure, when operating or rotating the restrict member 200 that is fitted with the support member 192 in a removal preventive manner, the guide piece 212 is guided along the guide groove 210, which makes it possible not only to stabilize the restrict member 200 with no play but also to rotate and move the same in a given direction.

Further, in the outer side wall 192a of the support member 192, there are formed a plurality of (in the present embodiment, five, that is, first to fifth) click grooves 214a, 214b, 214c, 214d and 214e in such a manner that they are respectively arranged along the peripheral direction of the outer side wall 192; and, on the outer periphery of the restrict member 200, there are provided a plurality of click pieces 216 which can be respectively engaged with the first to fifth click grooves 214a, 214b, 214c, 214d and 214e. According to this structure, the rotational operation amount of the restrict member 200 can be switched stepwise, so that, while the four projecting portions 208 of the restrict member 200 are selectively engaged with or disengaged from the recessed portions 206 of their corresponding brake members 196, the restrict member 200 can be stabilized provisionally in its non-rotating state (that is, in its rest state).

Here, description will be given below concretely of the operation to switch the four brake members 196 selectively to their respective contactable states or uncontactable states with respect to the brake surface 194a of the annular brake body 194, by operating or rotating the restrict member 200.

By the way, in the following operation description, for the sake of convenience, the four brake members 196 are expressed as first to fourth brake members 196a, 196b, 196c and 196d, while the four projecting portions 208 of the restrict member 200 are expressed as first to fourth projecting portions 208a, 208b, 208c and 208d, respectively.

Figure 11A:
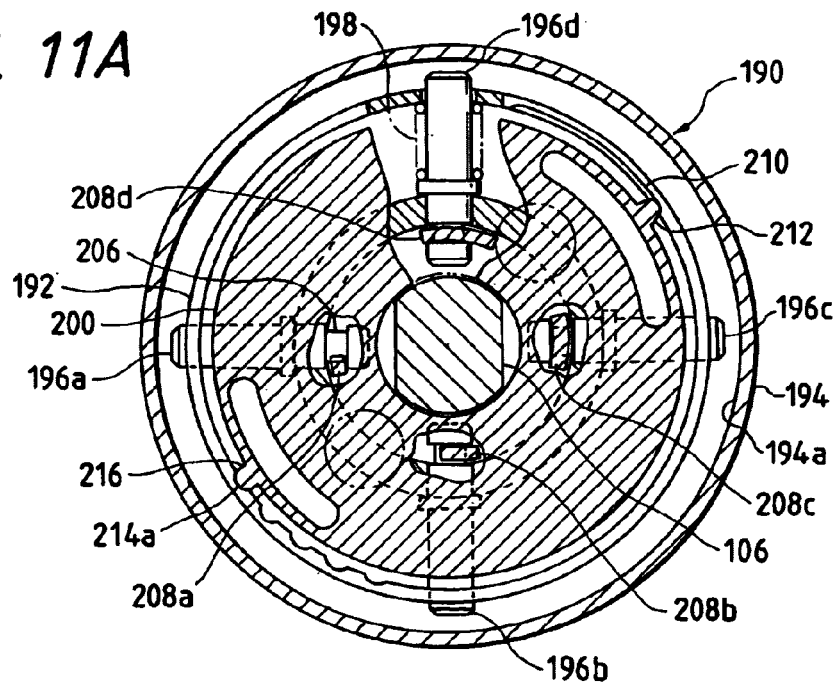
FIGS. 11A to 11E show states of the brake members according to the rotational operation of the restrict member; in particular.

Now, in FIG. 11A, there is shown a state in which the restrict member 200 is operated or rotated to thereby bring the click piece 216 of the restrict member 200 into engagement with the first click groove 214a of the support member 192.

In this state, the first to fourth projecting portions 208a, 208b, 208c and 208d of the restrict member 200 are all engaged with the recessed portions 206 of the first to fourth brake members 196a, 196b, 196c and 196d. That is, the first to fourth brake members 196a, 196b, 196c and 196d are all held in such a manner that they are spaced apart from the brake surface 194a of the annular brake body 194. At the then time, the centrifugal brake device 190, in the fishing line play-out operation, is switched over to a state in which it does not apply a brake force to the spool 106a at all. As a result of this, the spool 106a can be always maintained in a freely rotatable state.

Figure 11B:
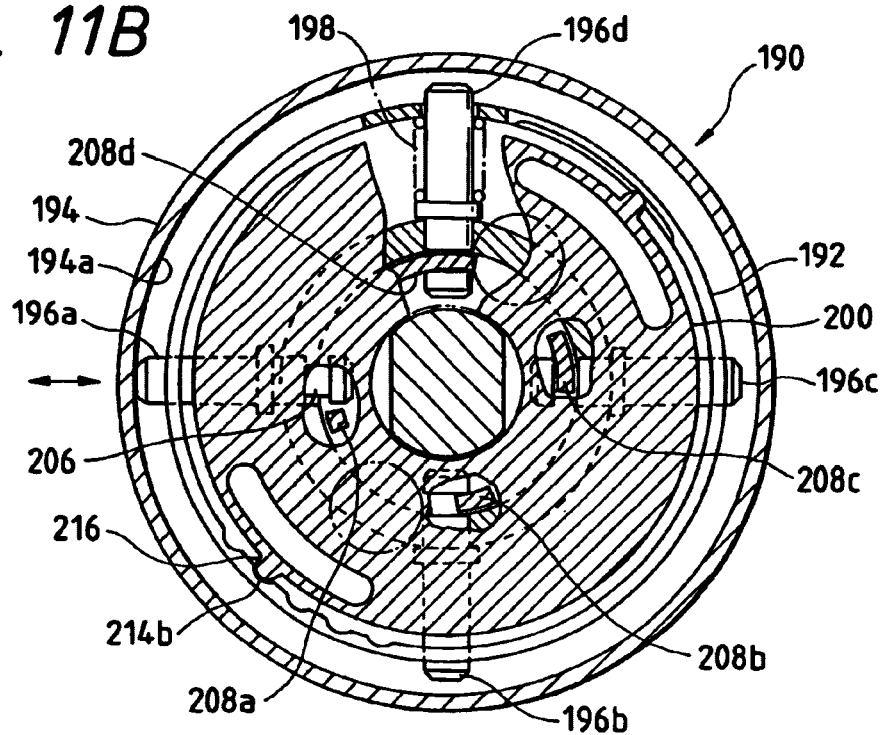

Now, in FIG. 11B, there is shown a state in which the restrict member 200 is operated or rotated to thereby bring the click piece 216 thereof into engagement with the second click groove 214a of the support member 192.

In this state, the second to fourth projecting portions 208b, 208c and 208d of the restrict member 200 are respectively engaged with the recessed portions 206 of the second to fourth brake members 196b, 196c and 196d, whereas only the engagement between the first projecting portion 208a and the recessed portion 106 of the first brake member 196a is removed. That is, the second to fourth brake members 196b, 196c and 196d are all held in such a manner that they are spaced apart from the brake surface 194a of the annular brake body 194, whereas only the first brake member 196a is switched over to its contactable state with respect to the brake surface 194a of the annular brake body 194.

At the then time, the centrifugal brake device 190, in the fishing line play-out operation, is switched over to a state in which it can bring only the first brake member 196a into sliding contact with the brake surface 194a of the annular brake body 194 to thereby be able to apply a brake force corresponding to the sliding contact force to the spool 106a. In this case, when a centrifugal force (that is, a centrifugal force exceeding the urging force of the urging spring 198) is applied to the first brake member 196a during the rotation of the spool 106a, only the first brake member 196a is moved against the urging force of the urging spring 198 into sliding contact with the brake surface 194a, so that the weakest brake force can be applied to the spool 106a.

Figure 11C:
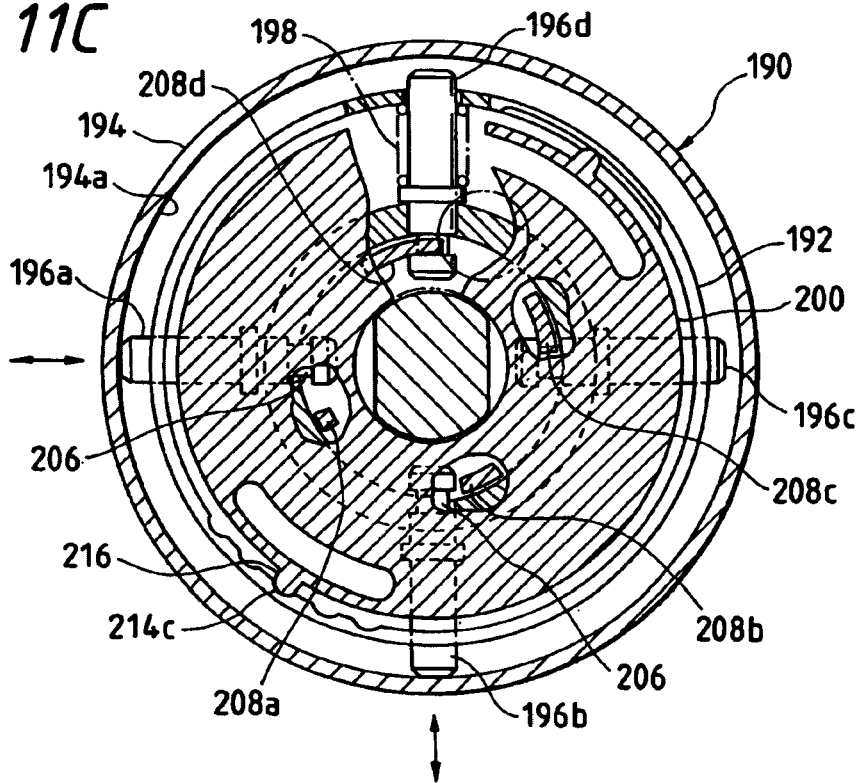

Now, in FIG. 11C, there is shown a state in which the restrict member 200 is operated or rotated to thereby bring the click piece 216 thereof into engagement with the third click groove 214c of the support member 192.

In this state, the third and fourth projecting portions 208c and 208d of the restrict member 200 are respectively engaged with the recessed portions 206 of the third and fourth brake members 196c and 196d, whereas the engagement between the first projecting portion 208a and the recessed portion 206 of the first brake member 196a as well as the engagement between the second projecting portion 208b and the recessed portion 206 of the second brake member 196b are removed. That is, the third and fourth brake members 196c and 196d are held in such a manner that they are spaced apart from the brake surface 194a of the annular brake body 194, whereas the first and second brake members 196a and 196b are respectively switched over to their respective contactable states with respect to the brake surface 194a of the annular brake body 194.

At the then time, the centrifugal brake device 190, in the fishing line play-out operation, is switched over to a state in which it can bring the first and second brake members 196a, 196b into sliding contact with the brake surface 194a of the annular brake body 194 to thereby be able to apply a brake force corresponding to their sliding contact forces to the spool 106a. In this case, when a centrifugal force (that is, a centrifugal force exceeding the urging force of the urging spring 198) is applied to the first and second brake members 196a and 196b during the rotation of the spool 106a, the first and second brake members 196a and 196b are respectively moved against the urging forces of the urging springs 198 into sliding contact with the brake surface 194a, so that a brake force of an intermediate degree of intensity can be applied to the spool 106a.

Figure 11D:
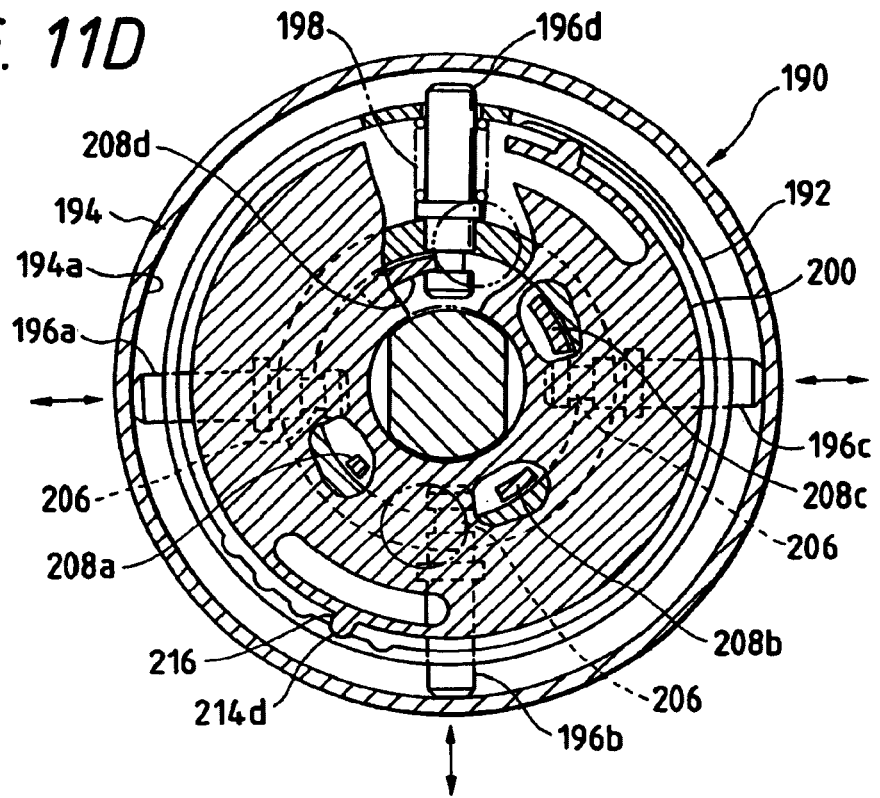

Now, in FIG. 11D, there is shown a state in which the restrict member 200 is operated or rotated to thereby bring the click piece 216 thereof into engagement with the fourth click groove 214d of the support member 192.

In this state, only the fourth projecting portion 108d of the restrict member 200 is engaged with the recessed portion 106 of the fourth brake member 196d, whereas the engagement between the first projecting portion 208a and the recessed portion 206 of the first brake member 196a, the engagement between the second projecting portion 208b and the recessed portion 206 of the second brake member 196b, and the engagement between the third projecting portion 208c and the recessed portion 206 of the third brake member 196c are respectively removed. That is, only the fourth brake member 196c is held in such a manner that it is spaced apart from the brake surface 194a of the annular brake body 194, whereas the first to third brake members 196a, 196b and 196c are switched over to their respective contactable states with respect to the brake surface 194a of the annular brake body 194.

At the then time, the centrifugal brake device 190, in the fishing line play-out operation, is switched over to a state in which it can bring the first to third brake members 196a, 196b and 196c into sliding contact with the brake surface 194a of the annular brake body 194 to thereby be able to apply a brake force corresponding to their sliding contact forces to the spool 106a. In this case, when a centrifugal force (that is, a centrifugal force exceeding the urging force of the urging spring 198) is applied to the first to third brake members 196a, 196b and 196c during the rotation of the spool 106a, the first to third brake members 196a, 196b and 196c are respectively moved against the urging forces of their respective urging springs 198 into sliding contact with the brake surface 194a of the annular brake body 194, so that a relatively strong brake force can be applied to the spool 106a.

Figure 11E:
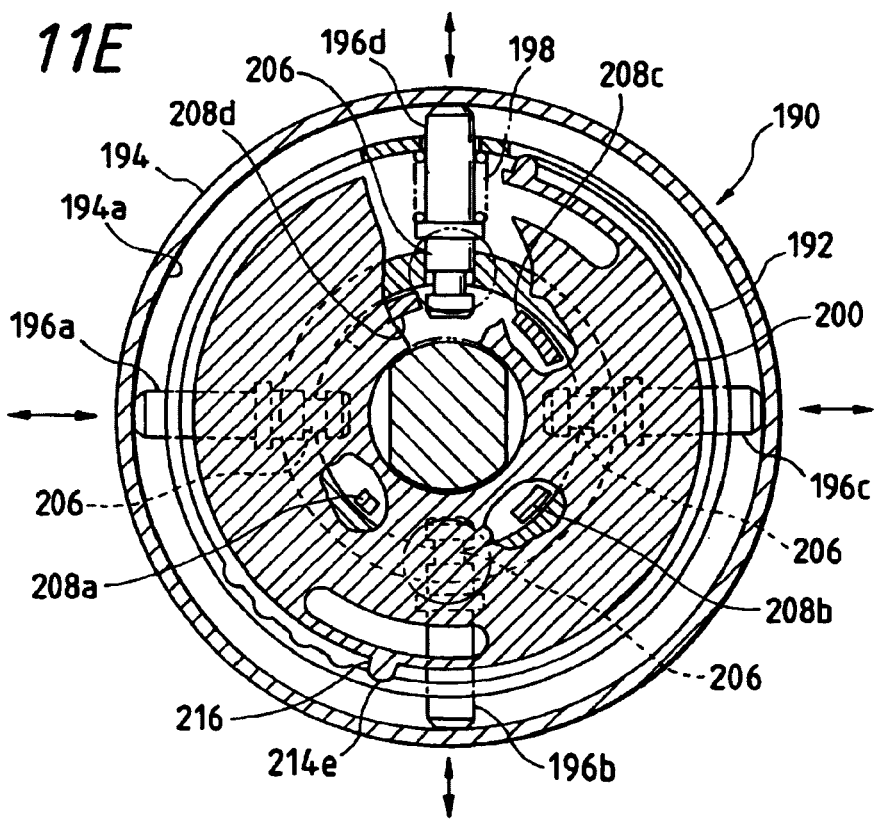

Now, in FIG. 11E, there is shown a state in which the restrict member 200 is operated or rotated to thereby bring the click piece 216 thereof into engagement with the fifth click groove 214e of the support member 192.

In this state, the first to fourth projecting portions 208a, 208b, 208c and 208d are all disengaged from the recessed portions 206 of the first to fourth brake members 196a, 196b, 196c and 196d. That is, the first to fourth brake members 196a, 196b, 196c and 196d are all held in such a manner that they are contactable with the brake surface 194a of the annular brake body 194.

At the then time, the centrifugal brake device 190, in the fishing line play-out operation, is switched over to a state in which it can bring the first to fourth brake members 196a, 196b, 196c and 196d into sliding contact with the brake surface 194a of the annular brake body 194 to thereby apply a brake force corresponding to their sliding contact forces to the spool 106a. In this case, during rotation of the spool 106a, when a centrifugal force (that is, a centrifugal force exceeding the urging force of the urging spring 198) is applied to the first to fourth brake members 196a, 196b, 196c and 196d, the first to fourth brake members 196a, 196b, 196c and 196d are moved against the urging forces of their respective urging springs 198 in the radial direction of the restrict member 200 into sliding contact with the brake surface 194a of the annular brake body 194, thereby being able to apply the strongest brake force to the spool 106a.

In this manner, according to the centrifugal brake device 190 that is applied to the present embodiment, if the restrict member 200 is operated or rotated to thereby selectively engage or disengage the first to fourth projecting portions 208a, 208b, 208c and 208d with respect to the recessed portion 206 of the first to fourth brake members 196a, 196b, 196c and 196d respectively, then a desired number of brake members 196a, 196b, 196c and 196d can be selectively switched over to their respective contactable states or to their respective uncontactable states with respect to the brake surface 194a of the annular brake body 194. As a result of this, in the fishing line play-out operation, one or more of the brake members 196a, 196b, 196c and 196d selected can be brought into sliding contact with the brake surface 194a of the annular brake body 194 and a brake force corresponding to their sliding contact forces can be applied to the spool 106a, which makes it possible to adjust finely the brake force that is applied to the spool 106a.

Further, in the centrifugal brake device 190 that is applied to the present embodiment, the selected brake members 196a, 196b, 196c and 196d are not slidingly contacted with the brake surface 194a of the annular brake body 194 instantaneously and with the same force due to the centrifugal force, but the brake members 196a, 196b, 196c and 196d are respectively slidingly contacted with the brake surface 194a of the annular brake body 194 gradually or steadily against the urging forces of the urging springs 198. That is, since the sliding contact forces of the brake members 196a, 196b, 196c and 196d with respect to the brake surface 194a of the annular brake body 194 are allowed to vary, that is, increase or decrease according to the intensity of the centrifugal force, the brake force to be applied to the spool 106a can be adjusted further finely.

Still further, according to the centrifugal brake device 190 that is applied to the present embodiment, unless a centrifugal force exceeding the urging force of the urging spring 198 is applied thereto, the brake members 196a, 196b, 196c and 196d can be held in such a manner that they are spaced apart from the brake surface 194a of the annular brake body 194, thereby being able to maintain the free rotation of the spool 106a corresponding to the rotation speed (especially, low rotation speed) of the spool 106a in the fishing line play-out operation.

Therefore, according to the fishing reel incorporating the thus structured centrifugal brake device 190, it is possible to carry out a casting operation which can properly deal with the varying conditions (such as, the weight of terminal tackles, a distance up to a fishing point, wind, the skill of an angler, and the like) in an actual fishing spot.

By the way, in the above-mentioned embodiment, the brake members 196a, 196b, 196c and 196d are switched sequentially in this order over to their respective contactable states with respect to the brake surface 194a of the annular brake body 194. However, the invention is not limited to this but, according to the invention, even if the shape dimensions and arrangements of the projecting portions 208 are changed to thereby change the switching order of the first to fourth brake members 196a, 196b, 196c and 196d, similar operation effects can also be provided.

Third Embodiment

Now, description will be given below of a third embodiment of a fishing reel according to the invention. By the way, in the present embodiment, description will be also given of a double-bearing type reel as a fishing reel. In this third embodiment, the portions similar in structure to the second embodiment are given the same designation and thus the description thereof are omitted here.

Figure 12:
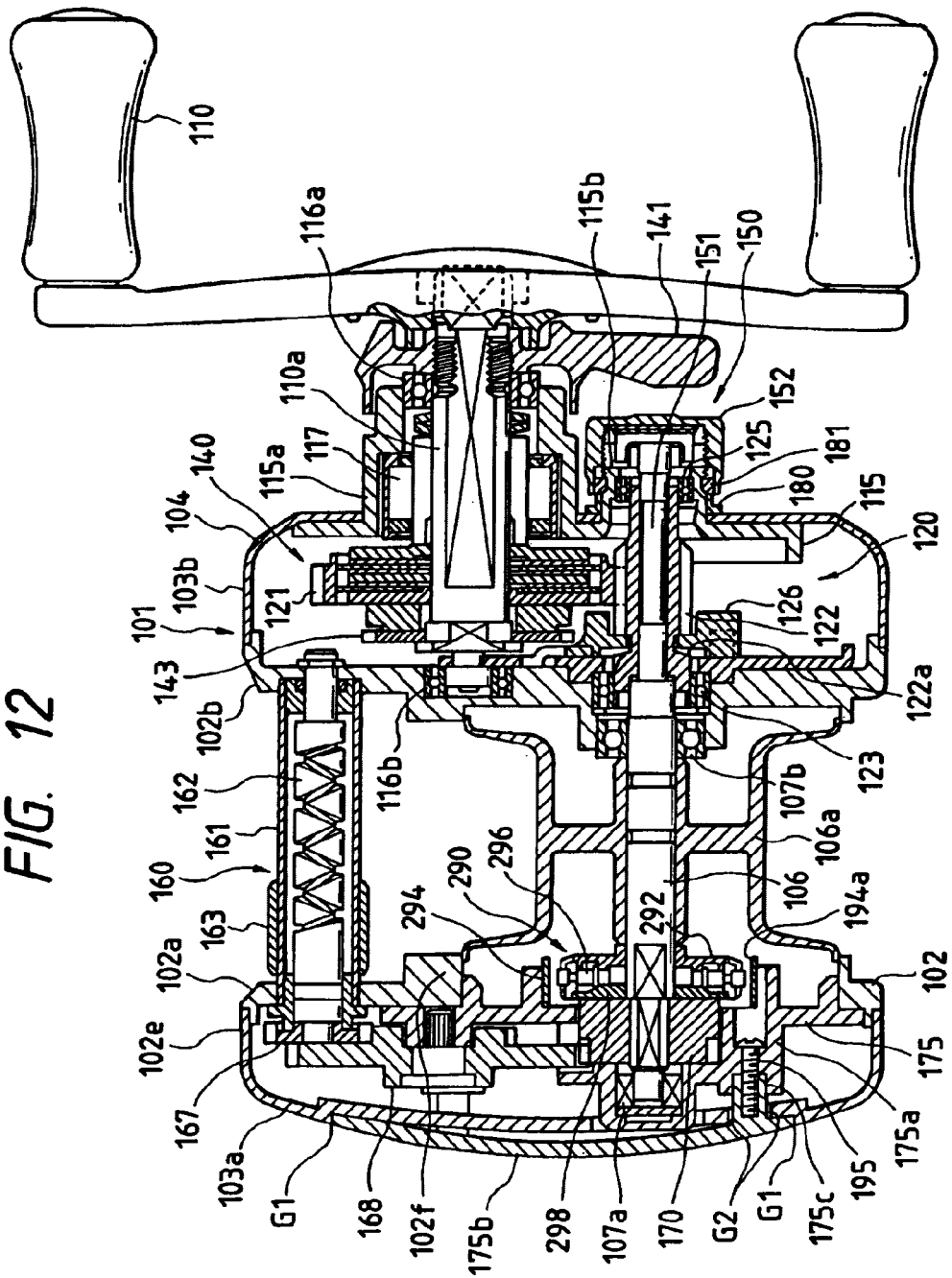
FIG. 12 is a partially sectional side view of the whole structure of a fishing reel according to a third embodiment of the invention.
Figure 13A:
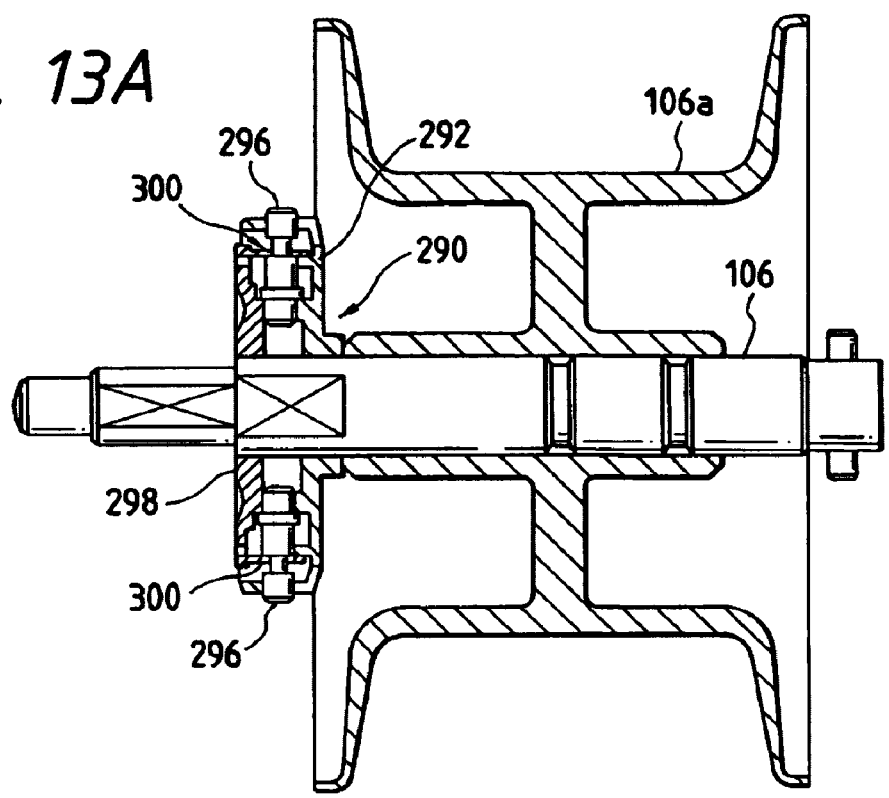
FIG. 13A is an enlarged section view of a state in which a centrifugal brake device is disposed on a spool shaft.
Figure 13B:
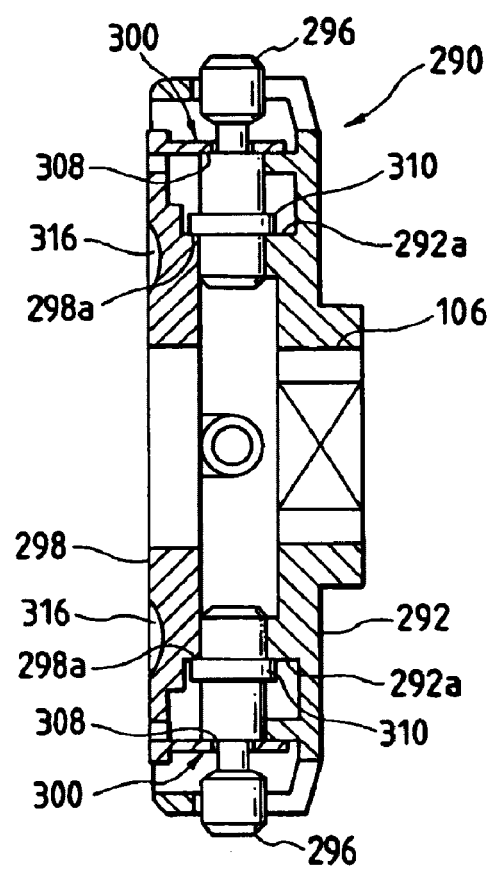
FIG. 13B is an enlarged section view of the structure of the centrifugal brake device.

As shown in FIGS. 12 to 13B, the centrifugal brake device 290 comprises a support member 292 fixed to the spool shaft 106 in a rotation preventive manner; an annular brake body 294 which is fixed to the reel main body 104 and also in the inner periphery of which there is formed a brake surface 294a; a plurality of brake members 296 which are respectively supported on the support member 292 in a removal preventive manner and can be moved not only in a direction where they approach the brake surface 294a of the annular brake body 294 but also in a direction where they are moved away from the brake surface 294a; a plurality of urging means respectively for holding their respective brake members 296 in such a manner that the brake members 296 are spaced apart from the brake surface 294a of the annular brake body 294 by a given distance, and also for urging the brake members 296 in the direction where the brake members 296 move away from the brake surface 294a of the annular brake body 294 against a centrifugal force acting on the brake members 296 while the spool 106a is rotating; and, adjusting means, while the spool 106a is rotating, for adjusting a sliding contact force used to bring the brake members 296 into sliding contact with the brake surface 294a of the annular brake body 294 against the urging forces of their respective urging means.

By the way, the number of the brake members 296 can be increased or decreased according to their using objects or the like and, in the present embodiment, there are provided four brake members 296 which are supported on the support member 292 in such a manner as to extend along the peripheral direction of the support member 292 at regular intervals.

Each of the urging means, which are applied to the present embodiment, includes an elastic hold member 300 which is formed in such a manner as to extend out from a plate 298 rotatably mounted on the support member 292 by a given length and also which is used to elastically hold its corresponding brake member 296 with a given elastic force.

As shown in FIGS. 14A to 16B, in the plate 298, there is formed an arc groove 302 in such a manner as to extend along the peripheral direction thereof; whereas, in the support member 292, there is provided a pawl member 304 in such a manner as to project therefrom. That is, due to the engagement of the pawl member 304 into the arc groove 302, the plate 298 is rotatably mounted on the support member 292.

Each of the elastic hold members 300 includes a base end portion 300a supported integrally on the plate 298 and an extension end portion 300b extended from the base end portion 300a by a given length, while the elastic hold force of the elastic hold member 300 decreases gradually as it goes from the base end portion 300a to the extension end portion 300b. Also, in each elastic hold member 300, there is formed a substantially U-shaped engaging groove 306 in such a manner that it extends from the base end portion 300a to the extension end portion 300b. In particular, if the brake member 296 is engaged with this engaging groove 306, then the elastic hold member 300 is able to hold the brake member 296 in such a manner that the brake member 296 is spaced apart from the brake surface 294a of the annular brake body 294 by a given distance.

In more particular, each brake member 296 includes a sliding contact portion 108 with which the elastic hold member 300 can be slidingly contacted, and a contact portion 310 contactable with hold portions 292a and 298a respectively formed in the support member 292 and plate 298 (especially, see FIG. 13B).

That is, if the brake member 296 is engaged with the engaging groove 306 of the elastic hold member 300, then the sliding contact portion 308 of the brake member 296 can be slidingly contacted with the elastic hold member 300 and, at the same time, the contact portion 310 thereof can be contacted with the hold portions 292a and 98a of the support member 292 and plate 298. In this state, due to the securing action of the elastic hold member 300, the contact portion 310 of the brake member 296 is restricted in position (in this position restriction, there may be present slight gaps between the contact portion 310 and the hold portions 292a, 298a) in a state where the elastic force of the elastic hold member 300 acts on the hold portions 292a and 298a of the support member 292 and plate 298 and the contact portion 310 is thereby contacted with the hold portions 292a and 298a, or in a state where such elastic force is not cause to act thereon, so that the contact portion 310 of the brake member 296 holds the brake member 296 in such a manner as to be spaced apart from the brake surface 294a of the annular brake body 294 by a given distance.

Also, the adjusting means that is applied to the present embodiment includes a plurality of engaging recessed portions 112 respectively formed in the support member 292, and a single engaging projecting portion 314 which is provided on the plate 298 and can be engaged with the engaging recessed portions 312; and, the adjusting means is further structured such that, if the plate 298 is rotated to thereby switch the engaging position of the engaging projecting portion 314 with respect to the engaging recessed portions 312, then the holding position of the brake member 296 can be changed with respect to the elastic hold member 300. And, by changing the holding position of the brake member 296, the elastic holding force of the elastic hold member 300 can be adjusted.

In the plate 298, there are formed a plurality of finger guides 316; that is, by putting fingers onto the finger guides 316, the plate 298 can be rotated manually.

In order not only to prevent the play of the plate 298 but also to restrict the rotation range of the plate 298 in the rotational operation thereof, the adjusting means further includes a guide projection 318 which is provided on and projected from the plate 298 and, a guide groove 320 of a given length which is formed in the support member 292 and also into which the guide projection 318 can be freely slided. Due to provision of the guide groove 320, the plate 298 can be rotated by an amount equivalent to the length of the guide groove 320, with the result that, when the plate 298 is rotated, the brake member 296 can be prevented from being removed from the engaging groove 306 of the elastic hold member 300.

According to the present adjusting means, while the plate 298 can be rotated stably without producing any play with respect to the support member 292, the holding position of the brake member 296 with respect to the elastic hold member 300 can be changed; and, in this holding position changing operation, by bringing the engaging projecting portion 314 of the plate 298 into engagement with the recessed portions 312 of the support member 292, the brake member 296 can be positioned positively at a given holding position with respect to the elastic hold member 300.

Also, as described before, since the elastic hold force of each elastic hold member 300 decreases gradually as it goes from the base end portion 300a thereof to the extension end portion 300b thereof, by changing the holding position of the brake member 296 with respect to the elastic hold member 300 through the adjusting means, an elastic holding force corresponding to the varying conditions (such as, the weight of terminal tackles, a distance up to a fishing point, wind, the skill of an angler, and the like) in an actual fishing spot can be applied to the brake member 296.

Figure 14A:
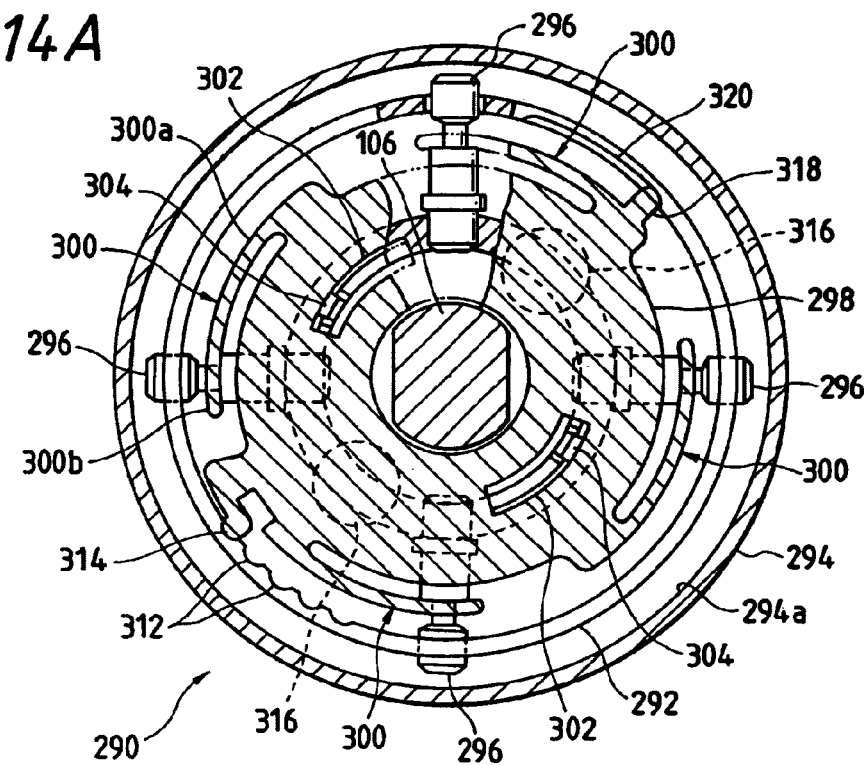
FIGS. 14A and 14B show a state of the centrifugal brake device in which brake members are elastically held on the extension end portions of their corresponding elastic hold members; in particular.
Figure 14B:
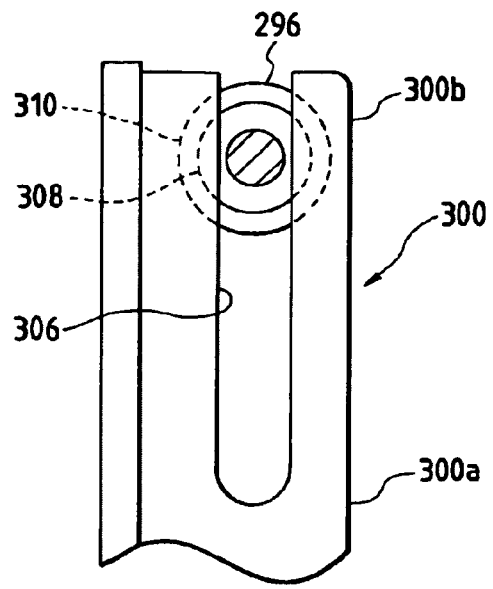

For example, in FIGS. 14A and 14B, there is shown a state in which the brake members 296 are elastically held by the extension end portions 300b of their corresponding elastic hold members 300. The extension end portion 300b of each elastic hold member 300 is the weakest in the elastic holding force and it can be elastically deformed by a centrifugal force (a relatively small centrifugal force) acting on the brake member 296 when the spool 106a is rotating at a relatively low speed. In this case, during the low-speed rotation of the spool 106a, if a centrifugal force exceeding the elastic holding force of the elastic hold member 300 is applied thereunto, then the brake member 296 can be slidingly contacted with the brake surface 294a of the annular brake body 294 with an optimum sliding contact force. This makes it possible to maintain the free rotation state of the spool 106a when it is rotating at the lowest speed.

Figure 15A:
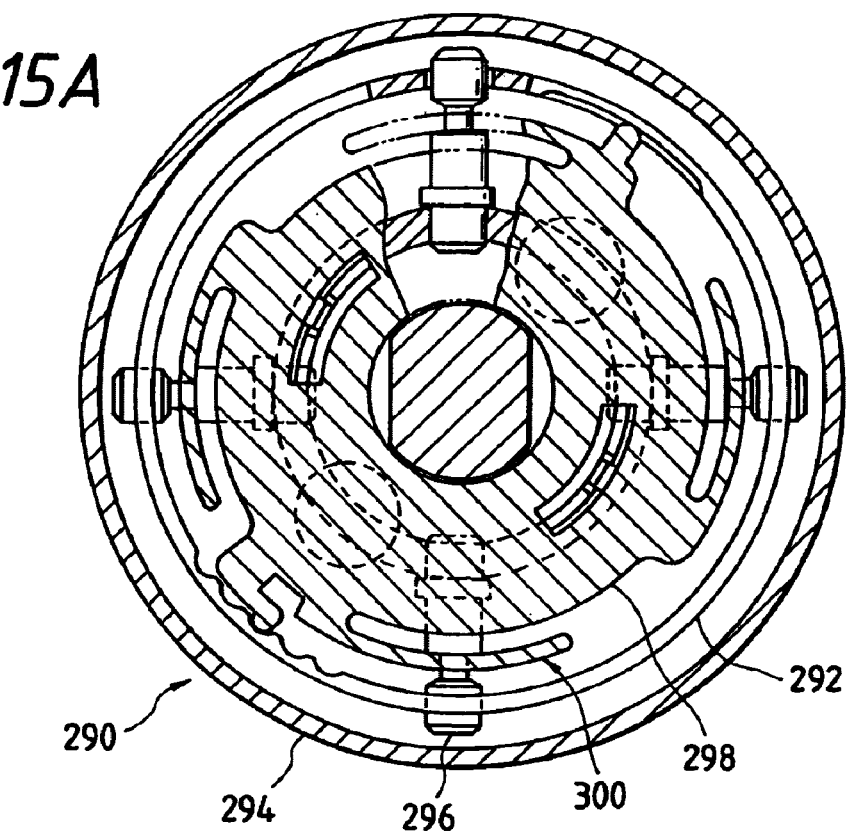
FIGS. 15A and 15B show a state of the centrifugal brake device in which brake members are elastically held on the intermediate portions of their corresponding elastic hold members; in particular.
Figure 15B:
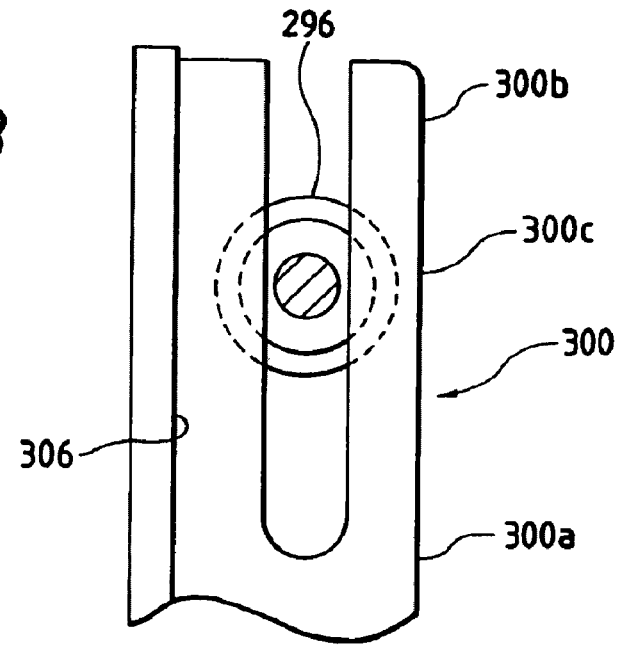

For example, in FIGS. 15A and 15B, there is shown a state in which the brake members 296 are elastically held by the intermediate portions 300c of their corresponding elastic hold members 300. The intermediate portion 300c of each elastic hold member 300 is formed in such a manner as to have an elastic holding force of an intermediate level and thus it can be elastically deformed by a centrifugal force (a centrifugal force of a relatively intermediate level) acting on the brake member 296 when the spool 106a is rotating at a middle speed. In this case, during the middle-speed rotation of the spool 106a, if a centrifugal force exceeding the elastic holding force of the elastic hold member 300 is applied thereunto, then the brake member 296 can be slidingly contacted with the brake surface 294a of the annular brake body 294 with an optimum sliding contact force. This makes it possible to maintain the free rotation state of the spool 106a when it is rotating at the low speed.

Figure 16A:
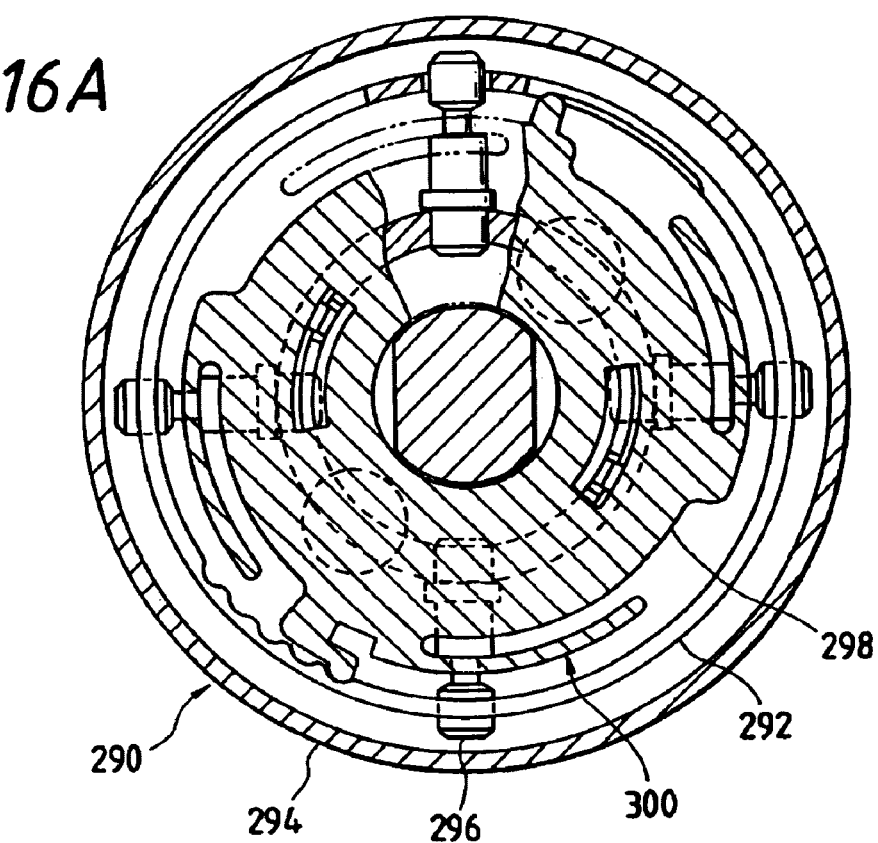
FIGS. 16A and 16B show a state of the centrifugal brake device in which brake members are elastically held on the base end portions of their corresponding elastic hold members; in particular.
Figure 16B:
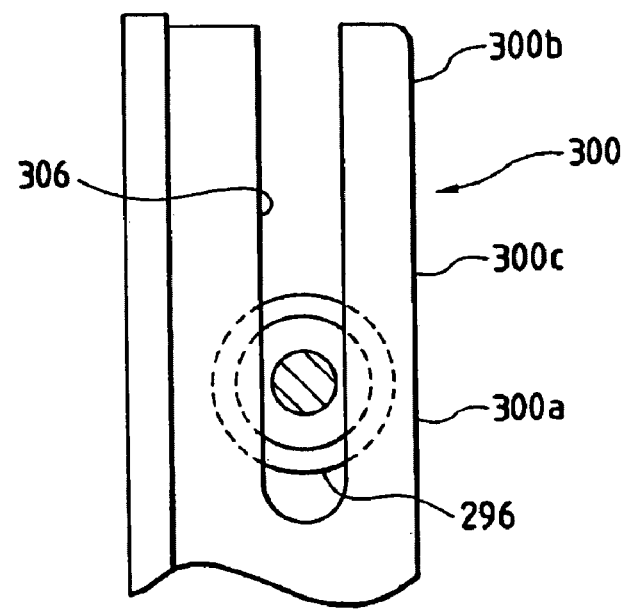

For example, in FIGS. 16A and 16B, there is shown a state in which the brake members 296 are elastically held by the base end portions 300a of their corresponding elastic hold members 300. The base end portion 300b of each elastic hold member 300 is formed in such a manner as to have the strongest holding force and it can be elastically deformed by a centrifugal force (a centrifugal force of a relatively large level) acting on the brake member 296 when the spool 106a is rotating at a relatively high speed. In this case, during the high-speed rotation of the spool 106a, if a centrifugal force exceeding the elastic holding force of the elastic hold member 300 is applied thereunto, then the brake member 296 can be slidingly contacted with the brake surface 294a of the annular brake body 294 with an optimum sliding contact force. This makes it possible to maintain the free rotation state of the spool 106a when it is rotating at the low and middle speeds.

As described above, according to the present embodiment, simply by rotating the plate 298 to thereby change the holding position of the brake member 296 with respect to the elastic hold member 300, for example, the elastic holding force that corresponds to the varying conditions (such as, the weight of terminal tackles, a distance up to a fishing point, wind, the skill of an angler, and the like) in an actual fishing spot can be applied to the brake member 296. Thanks to this, while maintaining the spool free rotation state corresponding to the rotational speed of the spool 106*a*, the brake force to be given to the spool 106*a* during rotation of the spool 106*a* can be adjusted finely. As a result of this, the terminal tackles can be thrown up to a desired point smoothly and positively, so that the efficiency of the casting operation can be enhanced.

By the way, in the above-mentioned embodiment, there is employed a structure in which the support member 292 is fixed to the spool shaft 106 unrotatably and supports the brake members 296 in such a manner that they are movable in the radial direction thereof but are prevented against removal, and the plate 298 rotatably mounted on the support member 292 can be operated, that is, can be rotated. However, this is not limitative but, alternatively, it is also possible to employ another structure in which, contrary to the above structure, the plate 298 is unrotatably fixed to the spool shaft 106 and the support member 292 supporting the brake members 296 is operated or rotated. In this structure as well, there can be obtained a similar effect to the above structure and also, with use of this structure, since the support member 292 can be rotated while gripping the outer periphery thereof, the efficiency of the rotation operation can be enhanced.

Figure 17A:
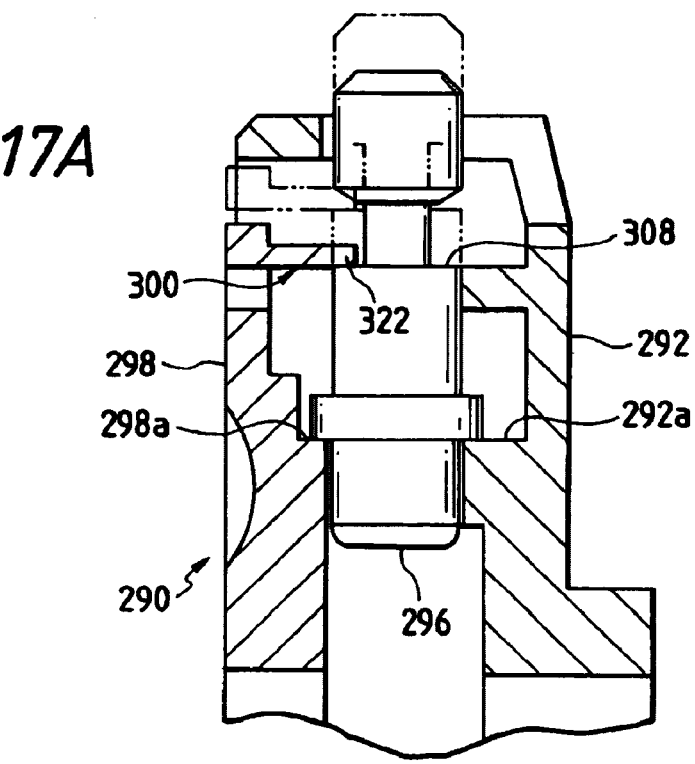
FIG. 17A is an enlarged section view, in part, of a centrifugal brake device applied to the first modification of the third embodiment; and, FIG. 17B is a plan view thereof, showing the relationship between the brake member and elastic hold member.
Figure 17B:
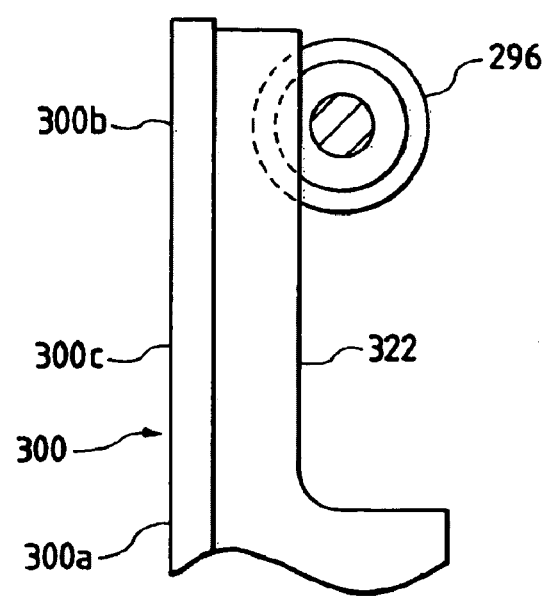

Also, the invention is not limited to the third embodiment but can be changed or modified variously in the following manner:

For example, as a first modification of the third embodiment, as shown in FIGS. 17A and 17B, urging means including a long-plate-shaped elastic hold member 300 may be provided and the brake member 296 may be secured to the one-side edge portion 322 of the elastic hold member 300, whereby the brake member 296 can be held in such a manner that it is spaced apart from the brake surface 294*a* of the annular brake body 294 by a given distance.

By the way, in this first modification, since the remaining portions thereof are similar in structure to the third embodiment, they are given the same designations and thus the description thereof is omitted here.

According to the first modification, the simplified shape of the elastic hold member 300 makes it possible to facilitate the molding of the elastic hold member 300 as well as the assembling of the centrifugal brake device 290. By the way, the other operations and effects of the first modification are similar to those of the third embodiment and thus the description thereof is omitted here.

Figure 18A:
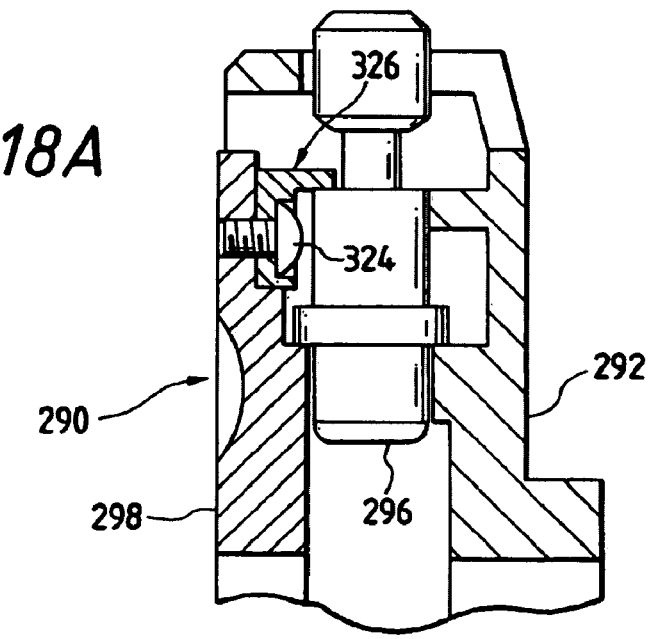
FIG. 18A is an enlarged section view, in part, of a centrifugal brake device applied to the second modification of the third embodiment.
Figure 18B:
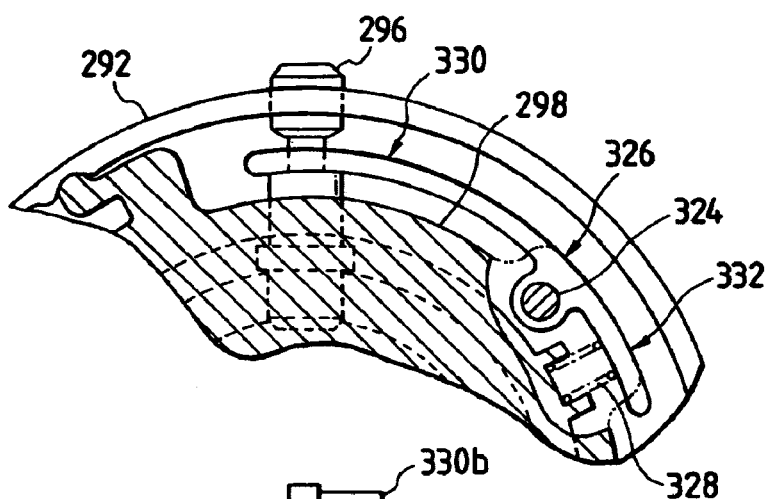
FIG. 18B is a section view thereof, when viewed from the plate side of FIG. 18A; and, FIG. 18C is a plan view thereof, showing the relationship between the brake member and elastic hold member; and, FIG. 19A is an enlarged section view, in part, of a centrifugal brake device applied to the third modification of the third embodiment; and, FIG. 19B is a plan view thereof, showing the relationship between the brake member and elastic hold member.
Figure 18C:
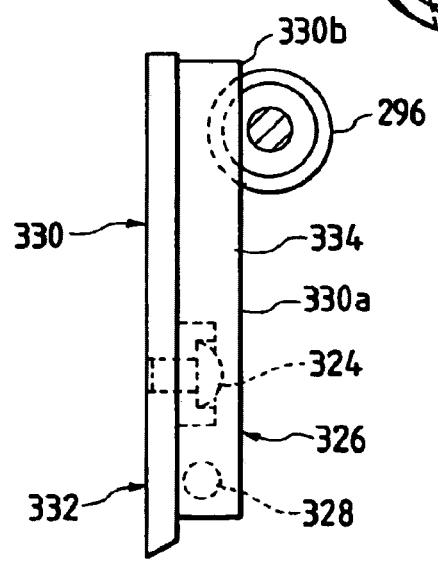

Also, in the third embodiment and first modification thereof, the urging means is structured such that it includes the elastic hold member 300 formed integrally with the plate 298. However, the urging means can also be structured in different manners. For example, as a second modification of the third embodiment, as shown in FIGS. 18A to 18C, the urging means includes a rigid body 326 rotatably mounted on the plate 298 through a screw 324, and a coiled compression spring 328 for elastically holding the rigid body 326 in such a manner that it can be moved with the screw 324 as a fulcrum thereof.

The rigid body 326 is composed of a hold portion 330 which is extended on the one-end side thereof with the screw 324 as a fulcrum thereof, and a support portion 332 extended on the other-end side thereof.

The hold portion 330 is formed in a long-plate shape, and includes a base end portion 330*a* connected to the plate 298 through the screw 324 and an extension end portion 330*b* which is extended from the base end portion 330*a* by a given length. On the other hand, to the support portion 332, there is connected the coiled compression spring 328 which is fixed to the plate 298.

The hold portion 330 is structured such that the brake member 296 can be secured to the one-side edge portion 334 of the hold portion 330. By the way, as the hold portion 330, for example, as shown in FIG. 16B, there can also be employed a structure that the brake member 296 is engaged with a substantially U-shaped engaging groove.

In the thus structured urging means, the compression force of the coiled compression spring 328 acts on the hold portion 330 centering on the screw 324 serving as the fulcrum and, therefore, as it goes from the base end portion 330*a* toward the extension end portion 330*b*, the elastic holding force thereof decreases successively. By the way, the other portions of the present modification are similar to those of the third embodiment and, therefore, they are given the same designations and thus the description thereof is omitted here.

Thus, according to the second modification, similarly to the third embodiment, by rotating the plate 298 to thereby change the holding positions of the brake members 296 with respect to their respective hold portions 330, the elastic holding forces corresponding to the varying conditions in an actual fishing spot can be applied to the brake members 296. As a result of this, it is possible to provide a fishing reel which can adjust finely the brake force to be applied the spool 106*a* during the rotation of the spool 106*a*; that is, it is possible to provide a fishing reel which is improved in the efficiency of the casting operation.

Figure 19A:
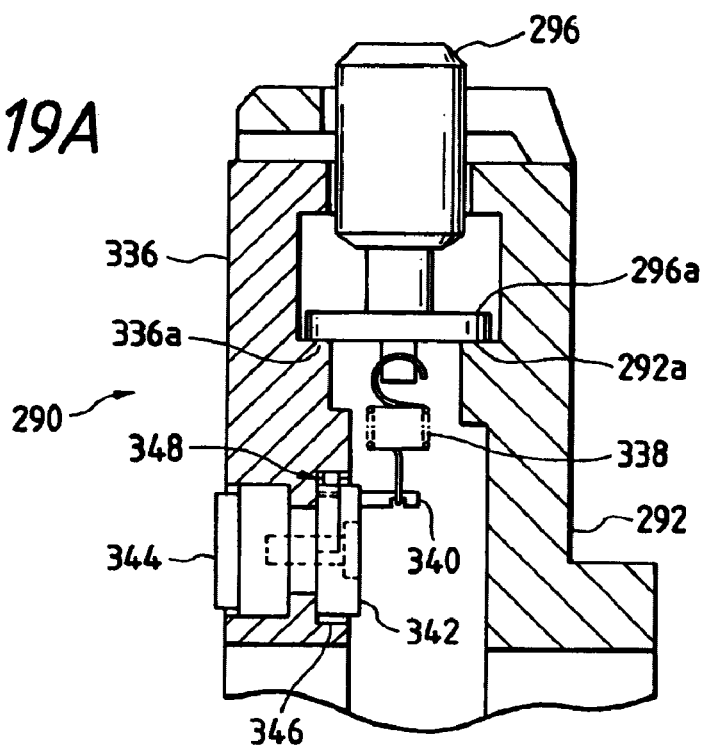
Figure 19B:
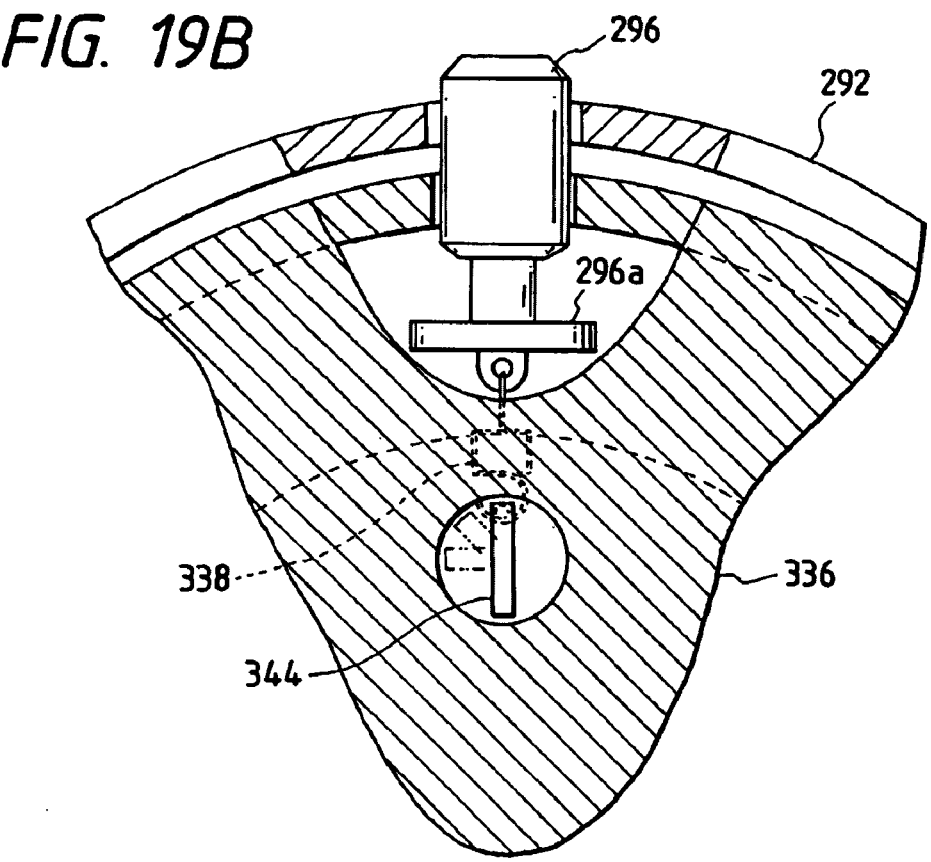

Further, in FIGS. 19A and 19B, there is shown a third modification of the third embodiment; in particular, in the third modification, the urging means includes an urging mechanism which is disposed in a plate 336 unrotatably fixed to the support member 292 and holds its corresponding brake member 296 with a given urging force.

In the present urging mechanism, there is provided a coiled tension spring 338 which holds the brake member 296 in such a manner that the brake member 296 is spaced apart from the brake surface 294*a* of the annular brake body 294: that is, using the tensile force of the coiled tension spring 338, the base end portion 296*a* of the brake member 296 is contacted with the contact portions 292*a* and 336*a* of the support member 292 and plate 336, thereby being able to hold the brake member 296 in such a manner that the brake member 296 is spaced apart from the brake surface 294*a* of the annular brake body 294. Referring further to the coiled tension spring 338, one end thereof is connected to the base end portion 296*a* of the brake member 296, whereas the other end thereof is connected to adjusting means which will be discussed later.

Now, referring to adjusting means employed in the third modification, it includes a support column 340 to which the other end of the coiled tension spring 338 is connected, and a rotary body 342 which supports the support column 340 in a swingable manner, while the rotary body 342 is screwed to an adjust knob 344 which is exposed to the outside of the plate 336. By the way, the rotary body 342 is rotatably stored within a circular groove 346 formed in the plate 336.

The adjust knob 344 is structured such that it can be rotated by hand: that is, if the adjust knob 344 is rotated manually (see a two-dot chained line shown in FIG. 19B) to thereby swing the support column 340, then the coiled tension spring 338 can be expanded and contracted.

In the present adjusting means, there is provided a click mechanism 348 by means of which the adjust knob 344 (rotary body 342) can be made to stand still at a desired rotation position. By the way, as the click mechanism 348, for example, there can be formed a single click pawl in an outer periphery of the rotary body 342 and a plurality of click grooves (not shown) each of which can be engaged with the click pawl in the inner periphery of the circular groove 346.

In the above-mentioned structure, if the adjust knob 344 is operated or rotated to thereby swing the support column 340 by a given amount, then the coiled tension spring 338 can be expanded and contracted by a given amount, so that the brake member 296 can be held in such a manner that it is urged with a given tensile force.

Therefore, according to the third modification, simply by rotating the adjust knob 344 by a desired amount, the tensile force to be applied to the brake member 296 can be made to vary finely, which makes it possible to adjust finely the sliding contact force necessary to bring the brake member 296 into sliding contact with the brake surface 294a of the annular brake body 294 against the tensile force of the coiled tension spring 338 during rotation of the spool 106a. As a result of this, it is possible to provide a fishing reel which can adjust finely the brake force to be applied the spool 106a during the rotation of the spool 106a; that is, it is possible to provide a fishing reel which is improved in the efficiency of the casting operation.

Further, according to the third modification, since the tensile force can be adjusted for the plurality of brake members 296 individually, the brake force to be applied to the spool 106a can be adjusted further finely.

As has been described heretofore, according to the invention, it is possible to provide a fishing reel which can control or adjust finely a brake force to be applied to a spool during rotation of the spool, thereby being able to carry out a casting operation with high efficiency.

The entire disclosure of each and every foreign patent application from which the benefit of foreign priority has been claimed in the present application is incorporated herein by reference, as if fully set forth.

While only certain embodiments of the invention have been specifically described herein, it will apparent that numerous modifications may be made thereto without departing from the spirit and scope of the invention.

The invention claimed is:

1. A fishing reel comprising:
 a spool rotatably supported in a reel main body;
 a support member integrally rotating with said spool;
 a plurality of brake members slidably supported to said support member;
 an annular brake surface provided in said reel main body, said brake surface being slidingly contactable with said brake members by a centrifugal force applied to said brake member when said spool is rotated;
 a plurality of urging means maintaining said brake members in a state which said brake members are respectively apart from said brake surface by a predetermined distance and urging said brake members in a direction which said brake members move away from said brake surface according to the rotation of said spool; and
 an adjusting mechanism adjusting a sliding contact force between said brake member and said brake surface being exerted when said brake member slidingly contacts with said brake surface against an urging force of said urging means;
 said urging means being a cantilever member provided in said support member so as to extend in a rotational direction of said spool and having a free end and a fixed end;
 said adjusting mechanism shifting said urging means in said rotational direction so that said brake members shift between said free end and said fixed end of said urging means.

2. The fishing reel according to claim 1, further comprising:
 a restrict member restricting the movement of said brake members so as to switch said brake members selectively over between a contactable state in which said brake member is contactable with said brake surface and an un-contactable state in which said brake member is not contactable with said brake surface.

3. The fishing reel according to claim 2, wherein said brake members contact with said brake surface by said centrifugal force before said spool rotates faster than a play-out speed of a fishing line.

4. A fishing reel comprising:
 a spool rotatably supported in a reel main body;
 a support member integrally rotating with said spool;
 a plurality of brake members slidably supported to said support member for reciprocating movement along a straight line toward and away from said reel main body; and
 a brake surface provided in said reel main body, said brake surface being slidingly contactable with said brake members;
 wherein according to the rotation of said spool, an urging force is applied to said brake members in a direction where said brake members move away from said brake surface, and said brake members is slidingly contactable with said brake surface against said urging force, when a centrifugal force more than a predetermined value is applied to said spool; and wherein said urging means is a cantilever member provided in said support member so as to extend in a rotational direction of said spool and having a free end and a fixed end, and said adjusting mechanism shifts said urging means in said rotational direction so that said brake members shift between said free end and said fixed end of said urging means.

* * * * *